(12) United States Patent
    Fahey

(10) Patent No.: US 10,470,434 B2
(45) Date of Patent: Nov. 12, 2019

(54) TRUCK BED SAFETY DEVICE

(71) Applicant: K9truckNET, LLC, Somers, CT (US)

(72) Inventor: Thomas J. Fahey, Somers, CT (US)

(73) Assignee: K9truckNET, LLC, Somers, CT (US)

( * ) Notice: Subject to any disclaimer, the term of this patent is extended or adjusted under 35 U.S.C. 154(b) by 0 days.

(21) Appl. No.: 16/239,699

(22) Filed: Jan. 4, 2019

(65) Prior Publication Data

US 2019/0208740 A1    Jul. 11, 2019

Related U.S. Application Data

(63) Continuation of application No. 15/335,499, filed on Oct. 27, 2016, now Pat. No. 10,206,371.

(60) Provisional application No. 62/250,658, filed on Nov. 4, 2015.

(51) Int. Cl.
| | |
|---|---|
| *A01K 1/02* | (2006.01) |
| *B60J 7/10* | (2006.01) |
| *B60P 7/00* | (2006.01) |
| *B60P 7/08* | (2006.01) |

(52) U.S. Cl.
CPC ............ *A01K 1/0272* (2013.01); *B60J 7/104* (2013.01); *B60P 7/00* (2013.01); *B60P 7/0876* (2013.01)

(58) Field of Classification Search
CPC ........ A01K 1/0272; B60P 7/00; B60P 7/0876; B60J 7/104
USPC ...................................................... 296/24.31
See application file for complete search history.

(56) References Cited

U.S. PATENT DOCUMENTS

| | | | |
|---|---|---|---|
| 1,432,439 A | 10/1922 | Bixler | |
| 1,538,384 A * | 5/1925 | Crockett | ................. B60J 7/104 296/102 |
| 4,607,876 A | 8/1986 | Reed | |
| 4,813,734 A * | 3/1989 | Hoover | .................... B60J 7/102 296/100.17 |
| 4,824,157 A * | 4/1989 | Nielsen | .................... B60P 7/02 296/10 |
| 5,040,934 A | 8/1991 | Ross | |
| 5,065,699 A | 11/1991 | Marshall | |
| 5,186,513 A * | 2/1993 | Strother | ................... B60J 7/104 135/88.09 |
| 5,290,086 A | 3/1994 | Tucker | |
| 5,423,587 A * | 6/1995 | Ingram | .................... B60P 3/32 135/88.13 |
| D373,106 S * | 8/1996 | Guidi | ........................ D12/414.1 |
| 5,713,624 A | 2/1998 | Tower | |
| 5,752,736 A | 5/1998 | Nodier | |
| 5,887,932 A | 3/1999 | Pier, II | |
| 6,637,793 B2 * | 10/2003 | Krause | .................... B60P 3/14 224/403 |

(Continued)

*Primary Examiner* — Pinel E Romain
(74) *Attorney, Agent, or Firm* — Schmeiser, Olsen & Watts, LLP

(57) ABSTRACT

The disclosed safety device helps prevents the dog from falling from, being thrown from, or jumping from the back of a pickup truck by securing them with a safely attached net to the truck racks. The net grids (openings) are sized to either allow or prevent the dog from getting just their heads through the net. The net is easily removable for tall cargo and it also allows you to carry cargo that normally needs to be secured to the truck bed itself or in a truck with a cap. The cargo can be such as; commercial and residential construction material, yard debris, and sporting goods.

8 Claims, 29 Drawing Sheets

(56) References Cited

U.S. PATENT DOCUMENTS

| | | | |
|---|---|---|---|
| 6,942,275 B2* | 9/2005 | Corbett | B60J 7/102 |
| | | | 296/100.16 |
| 7,025,545 B1 | 4/2006 | Robison | |
| 7,128,364 B2* | 10/2006 | Stabile, Jr. | B60P 3/341 |
| | | | 296/159 |
| 7,229,121 B2 | 6/2007 | Fox et al. | |
| 7,832,455 B1 | 11/2010 | Johnston et al. | |
| 8,123,279 B2 | 2/2012 | Orr et al. | |
| 8,814,015 B2* | 8/2014 | Gier | B60R 9/06 |
| | | | 224/321 |
| 8,974,158 B1 | 3/2015 | Hatch et al. | |
| 8,979,157 B2 | 3/2015 | Nelson | |
| 9,016,759 B2 | 4/2015 | Ricketts et al. | |
| 9,421,932 B2 | 8/2016 | Renforth et al. | |
| 9,511,654 B2 | 12/2016 | Breen | |
| 9,849,822 B1 | 12/2017 | Dankert | |
| 10,272,754 B2* | 4/2019 | Johnson | B60J 7/106 |
| 2008/0122238 A1 | 5/2008 | Fulmer | |
| 2013/0121785 A1 | 5/2013 | Coury et al. | |
| 2017/0120834 A1 | 5/2017 | McLoughlin | |
| 2018/0222392 A1* | 8/2018 | Xiong | B60R 5/045 |

* cited by examiner

TRUCK BED SAFETY DEVICE

CROSS-REFERENCE TO RELATED APPLICATIONS

The present application relates to and takes priority from U.S. provisional application Ser. No. 62/250,658, filed on Nov. 4, 2015 and entitled "TRUCK BED SAFETY DEVICE", and is a continuation of U.S. non-provisional application Ser. No. 15/335,499, filed on Oct. 27, 2016 and entitled "TRUCK BED SAFETY DEVICE" which application issued on Feb. 19, 2019 as U.S. Pat. No. 10,206,371 B2, each of which application(s) and patent is hereby incorporated by reference in its/their entirety.

BACKGROUND

1. The Field of the Present Invention

The present invention relates to truck bed safety device for the safe travel of dogs in the interior section of a pick-up truck bed area.

2. General Background

According to the American Humane Society it is estimated that 100,000 dogs die each year riding in truck beds. In addition, veterinarians see numerous cases of dogs being injured because they jumped out or were thrown from the bed of a pickup truck. If these dogs are lucky enough to still be alive, broken legs and joint injuries are among the most common types of damage that they sustain and often result in amputation.

The current option for traveling with dogs in a truck bed are leash systems that require the dog to be leashed to the inside of truck bed. This still leaves the dog at risk of jumping out if the leash is not adjusted right or getting tangled in the leash itself. With multiple dogs in the truck bed the risks are even higher.

There exists a need for a safety device that uses a truck's rack system to enclose the bed of the truck with a net to help prevent deaths and injuries yet still give the dog the experience of being outside.

There exists a need for a safety device that uses a truck's rack system to enclose the bed of the truck with a net to help prevent the passage of heavy articles and debris of various sizes to outside of the truck bed.

SUMMARY OF THE INVENTION

The present invention includes a safety device that utilizes the rack system of the truck by securely attaching a cargo type net of different shapes, sizes, and material to the existing rack system of the truck. This will secure the dog in the truck bed without the current leashing systems and will abide by the Humane Society's requirements of; "prevent from falling from, being thrown from, or jumping from the motor vehicle." The present invention will prevent the passage of heavy articles and debris of various sizes to outside of the truck bed.

The main section of the safety device securely attaches to the front and rear truck racks extending down the sides of the rack covering truck bed securely. The rear tailgate rack can have another safety device attached to the top and sides of the truck rack with longer straps hanging down past the rear tail gate attaching to the truck bed. This will prevent the dog from jumping out and/or falling out of the back of the truck. Because of the removable strapping it will make it easy to open for loading by releasable straps.

For front (cab) racks with no built in protection on the rack itself a front net will be required. The front of the safety device will be strapped to the front rack secured to the top and sides of the rack with cinch straps. This will prevent a dog from jumping out and/or falling out of the truck by the truck cab and add some protection to the rear cab window.

Some models of the present invention will have a center top section cover which is water resistant material sewn into the top of the net to give some protection from both sun and rain. Along with the top section some models with the center section on the top will have netting attached to the safety device that can be unrolled down covering the sides of the safety device for added protection. The side netting will be secured to the sides of the safety device with Velcro and/or snaps.

The present invention allows dog owners with multiple dogs a safer place for them to travel rather than the current leash systems or on the seat of the truck cab. The present invention includes the benefit of securing loads (lite construction material, tire tubes, camping gear, etc.) that can't fit through the openings in the back of the truck to help prevent them from coming out of the bed of the truck.

In a first aspect, a first embodiment of the present invention a safety device for securing the space of a truck bed, the safety including at least one elongated barrier net which is capable of extending from the proximity of a front end of a truck bed to a rear end of the truck bed, the net structured and arranged to form a cage shaped substantially similar to a dimension outlined by the truck bed where the truck bed includes a rack system rigidly affixed the truck bed, the barrier net projecting across the dimension of the truck bed an amount sufficient to constitute an effective safety barrier for dogs located within the cage and to provide a barrier to prevent the dogs from falling out of the truck bed, wherein the barrier net is fixedly attached to the rack system and the truck bed such that the barrier net is held flexibly and securely in place substantially parallel to an exterior plane of the dimension outlined by the truck bed. The safety device may also include a series of releasable ropes forming substantially square spaces sized and shaped to restrict a dog's head from passing through the net barrier. The safety device may also include a series of releasable connections such that the net may be releasably connected to the rack system.

Some embodiments of the safety device include a solid material affixed to the barrier net in order to provide shade and shelter to the interior of the truck bed. In some embodiments the ropes are substantially flat.

In some embodiments of the safety device the net is made from a material that is flexible and provides a predetermined tensile strength such that a dog may be safely transported within the truck bed. In some a series of ropes interwoven at substantially right angles in order to form the cage shaped substantially similar to a dimension outlined by the truck bed where the truck bed.

Some embodiments include a heavy debris liner comprised of a coarse mesh for preventing the passage of heavy articles of debris and a fine debris liner comprised of a fine mesh for preventing the passage of smaller articles of debris, the fine mesh portion of the barrier net being releasably attached on at least one side or edge of the net so that the side or edge of the barrier net detaches at a predetermined wind or weight loading.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE PREFERRED EMBODIMENTS

Figure 1:
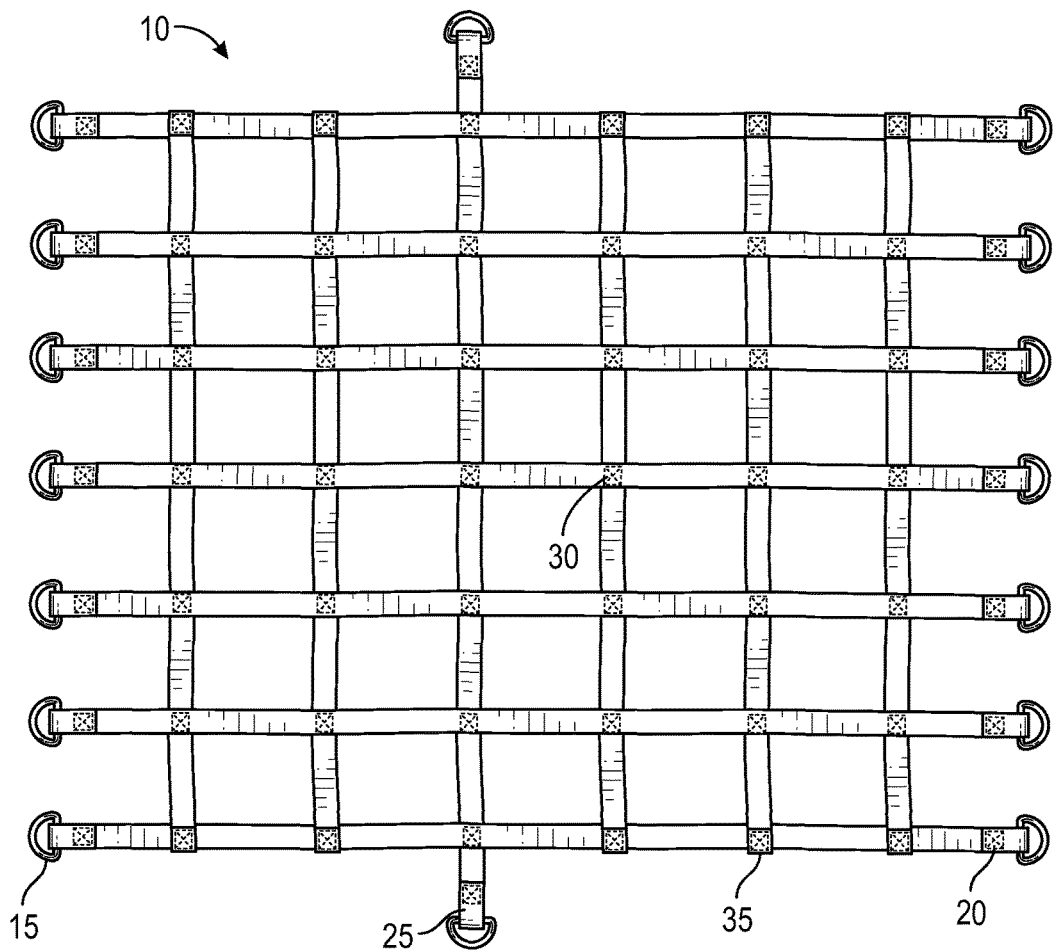
FIG. 1 shows a top view of the truck safety device according to one embodiment of the present invention.

The present disclosure will now be described more fully with reference to the figures in which an embodiment of the present disclosure is shown. The subject matter of this disclosure may, however, be embodied in many different forms and should not be construed as being limited to the embodiments set forth herein.

The present invention utilizes the rack system of the truck by securely attaching a cargo type net of different shapes, sizes, and material to the existing rack system of the truck. This will secure the dog in the truck bed without the current leashing systems and will abide by the Humane Society's requirements of; "prevent from falling from, being thrown from, or jumping from the motor vehicle."

A "rack" or "rack system" will refer to any rack attached to the front and rear of the truck bed such as; headache rack, truck bed rack, contractor rack, ladder rack, overhead truck rack, bed rack, roll bar, fixed rack, adjustable rack, or any type of truck bed rack system.

The main section of the present invention securely attaches to the front and rear truck racks extending down the sides covering truck bed securely. The rear tailgate rack will have another present invention attached to the top and sides of the truck rack with longer straps hanging down past the rear tail gate attaching to the truck bed. This will prevent the dog from jumping out and/or falling out of the back of the truck. Because of the removable strapping it will make it easy to open for loading by removing straps.

The present invention will be made of flat webbing or nylon rope depending on user requirements. The netting can be in different shapes ranging from but not limited to squares, circles, ovals, and triangles. The color of the material can vary as well and all stitching can be sewn with matching color. The additional top and side netting will also match the present invention.

The size of the openings in the present invention will range in size depending on requirements, for example a 12"×12" could be for extra-large dogs and a 4"×4" could be for smaller dogs. All sizes are in equal increments and the netting is fastened to the rack with releasable straps which allows it to be removed. The roll down side netting will also range in size in equal increments. The rear net (tailgate) has D-rings and is attached to the top of the rack with releasable straps and the sides of the net have D-rings to attach to the sides of the rack with releasable straps to allow the net to be easily opened for loading and unloading. The net extends down below the tailgate preventing the dog from going under the netting and can be attached to the truck if required. This also allows the tailgate to be opened and still have control of the dog from exiting.

There are two designs to secure the present invention to the racks depending on the trucks racks themselves. In the first design the net will attach to the front and rear racks will D-rings securing it to the rack with cinch straps. The second design will have a 3 piece support pole system attached to the net through the eyelets that the D-rings would have been in. The poles will then attach to the racks with cinch straps as well. There is also a single D-ring on each side of the present invention securing the sides of the net to the truck if required.

Referring now to FIG. 1 there is shown a safety device 10 that covers a truck bed. The safety device 10 can be made from nylon strapping, nylon rope or a material having similar properties weight and strength. D-rings 15 are attached to the material that will connect it to the front and rear truck rack with straps covering the bed of the truck. 3" of material 20 folded back and sewn to hold the D-ring 15 to the safety device or with the D-rings removed the 3 piece support poles slid through the loops. Side strap 25 with a D-ring attached and comes on both the nylon and rope present invention. This can be connected to the side of the truck bed if required. Intersections 30 of the net sewn together and in either the nylon or rope present invention. Ends of the straps 35 folded back and sewn to the bottom strap to secure the ends to the main section of the present invention.

Figure 2:
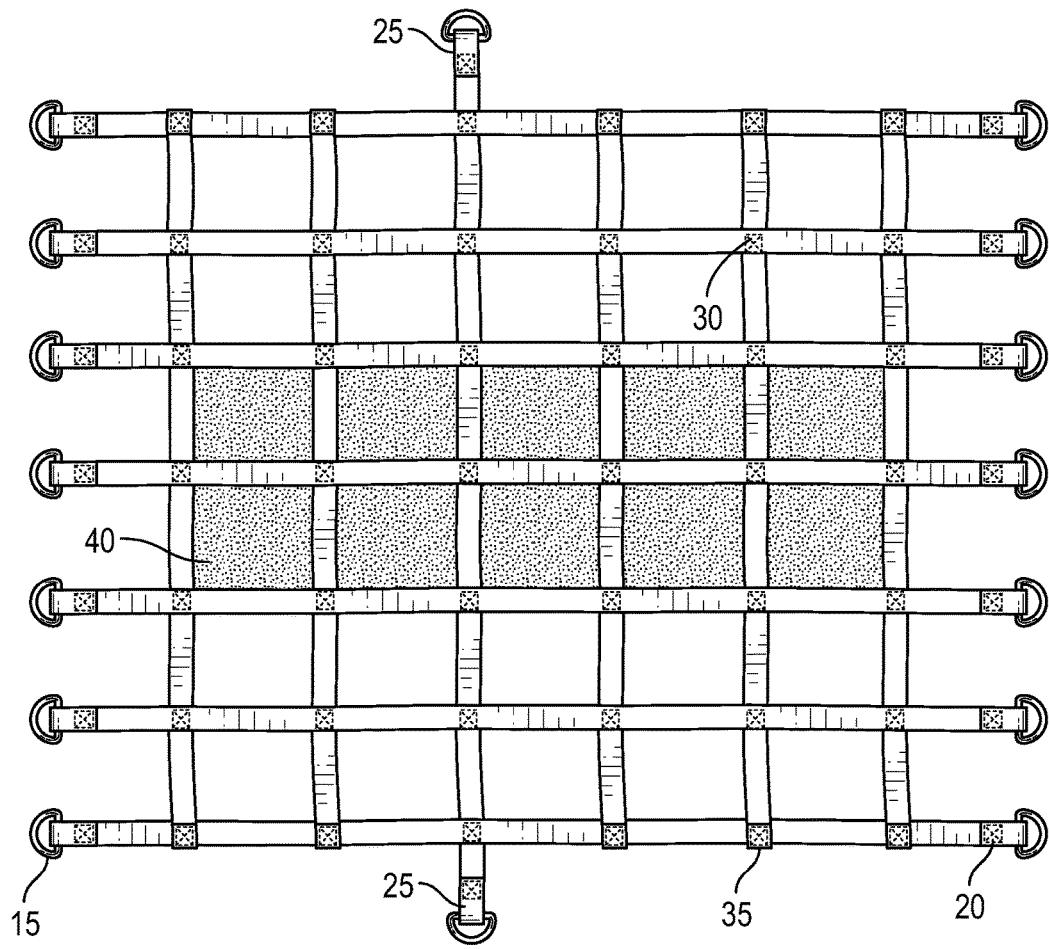
FIG. 2 shows a top view of the truck safety device according to another embodiment of the present invention.

Referring now to FIG. 2 there is the shown another version of the present invention that covers a truck bed. Safety device 10 may include a weatherproof center cover 40 may be sewn to the net which allows for some protection for the dog from sun and rain.

Figure 3:
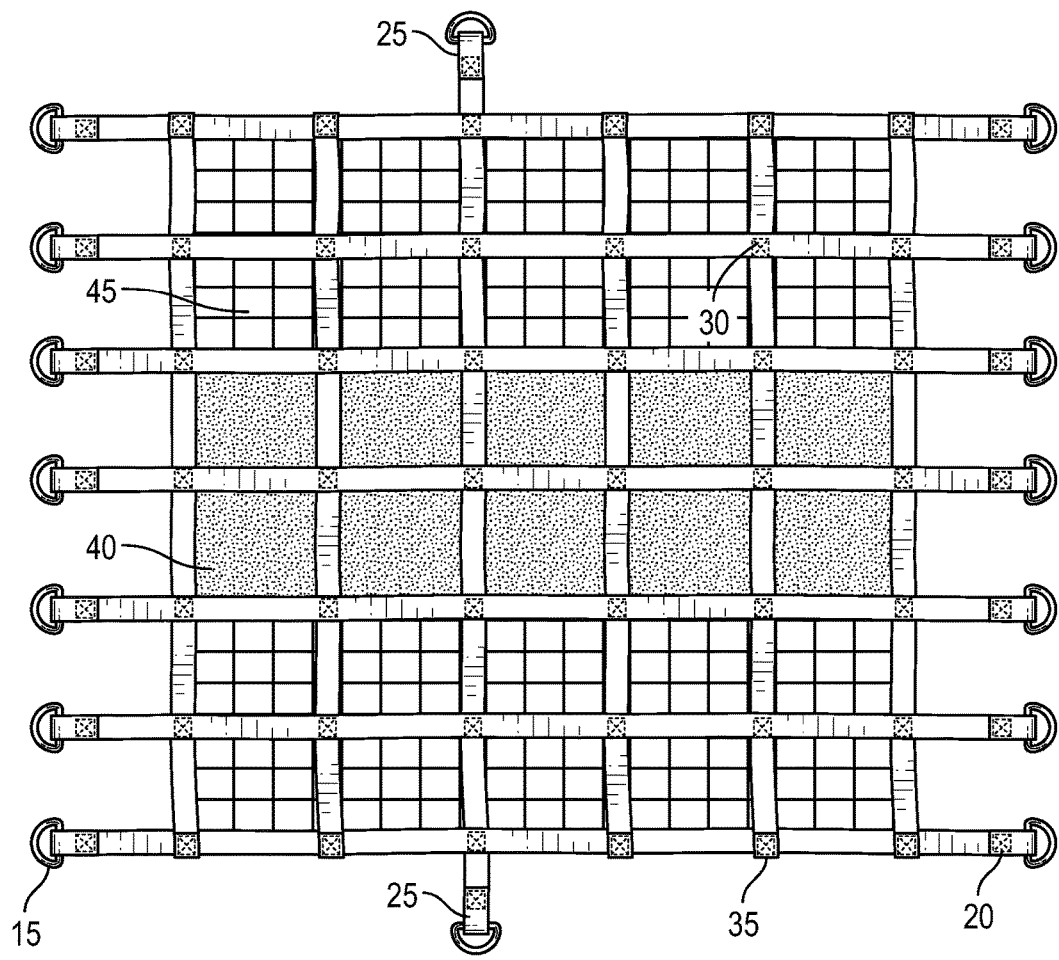
FIG. 3 shows a top view of the truck safety device according to another embodiment of the present invention.

Referring now to FIG. 3 there is shown another embodiment of the present invention that covers the truck bed. Safety device 10 may include smaller sized netting 45 sewn to the top of the present invention with straps holding in an open position. When rolled down it will attach to the present invention hook and looped strapping to the sides of the net allowing for more protection and in some cases keeping the dogs head in as well preventing heavy objects and fine debris from exiting the truck bed.

Figure 4:
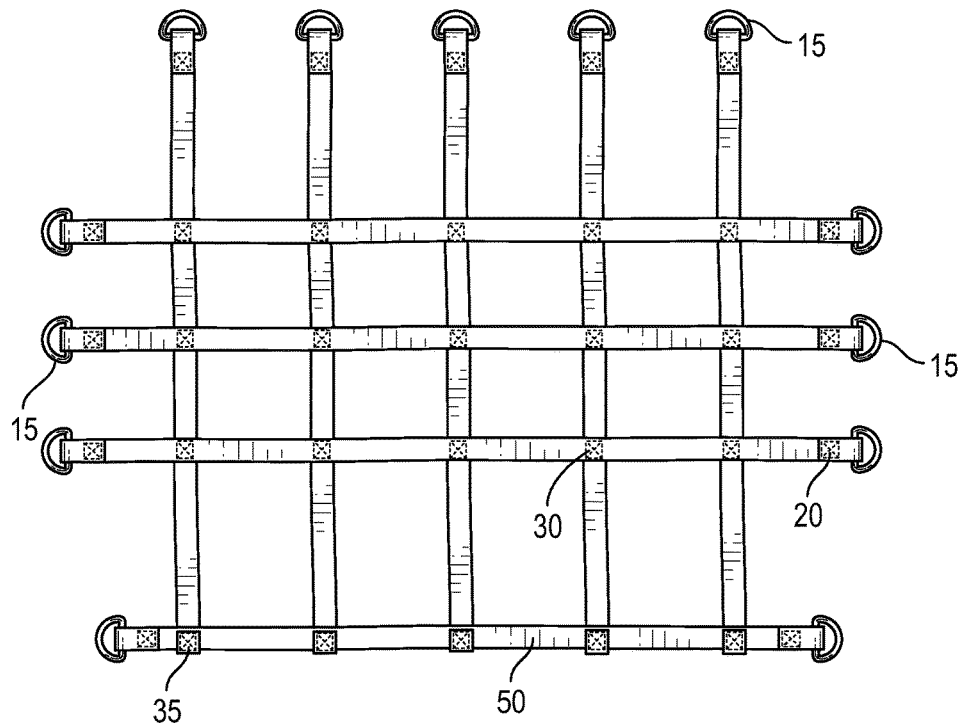
FIG. 4 shows a rear view of the truck safety device according to another embodiment of the present invention.

Referring now to FIG. 4 there is shown another embodiment of the present invention that covers the rear truck rack. Some embodiments include lower strap 50 with D-rings to allow the bottom of the truck bed near the area where the lift gate extends.

Figure 5:
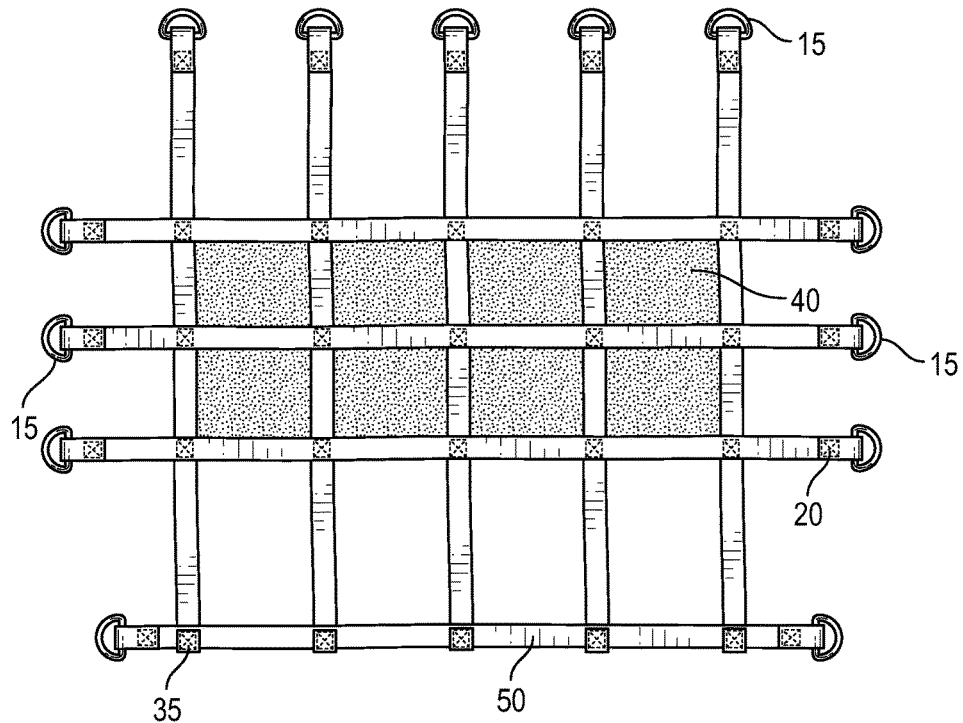
FIG. 5 shows a top view of the truck safety device according to another embodiment of the present invention.

Referring now to FIG. 5 another embodiment of the present invention showing the lower strap 50 with D-rings to allow the bottom of the present invention to the truck bed and weatherproof center cover 40 sewn to the net.

Figure 6:
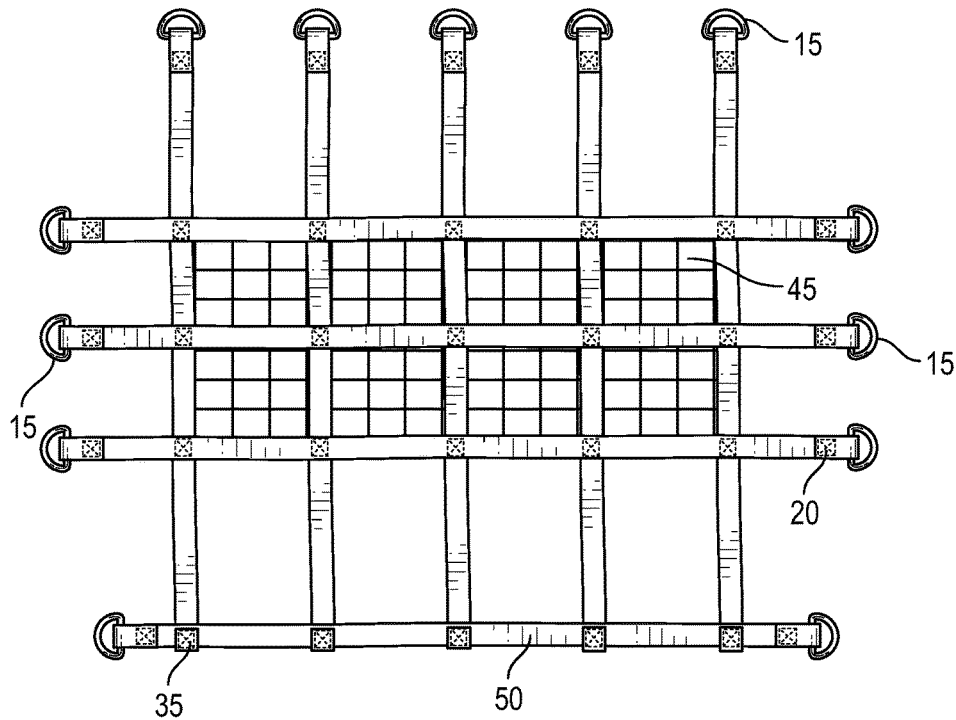
FIG. 6 shows a top view of the truck safety device according to another embodiment of the present invention.

Referring now to FIG. 6 there is shown another embodiment of the present invention having lower strap 50 with D-rings and smaller netting material 45 sewn to the safety device 10 allowing for more protection and in some cases keeping the heads of smaller dogs safely enclosed therein.

Figure 7:
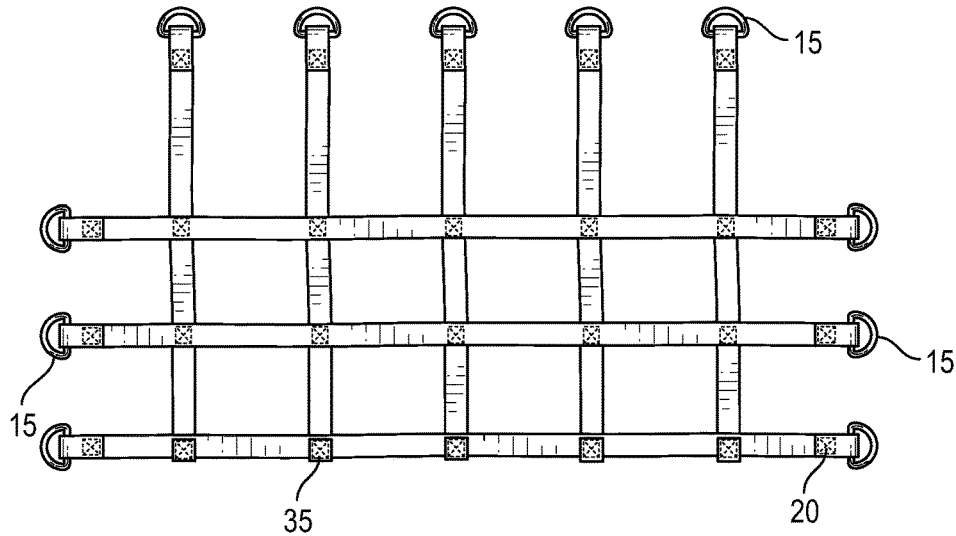
FIG. 7 shows a top view of the truck safety device according to another embodiment of the present invention.

Referring now to FIG. 7 there is shown an optional section of the present invention that covers the truck rack cab side. D-rings 25 can be attached to the material that will connect it to the top of the rear truck rack with cinch straps.

Figure 8:
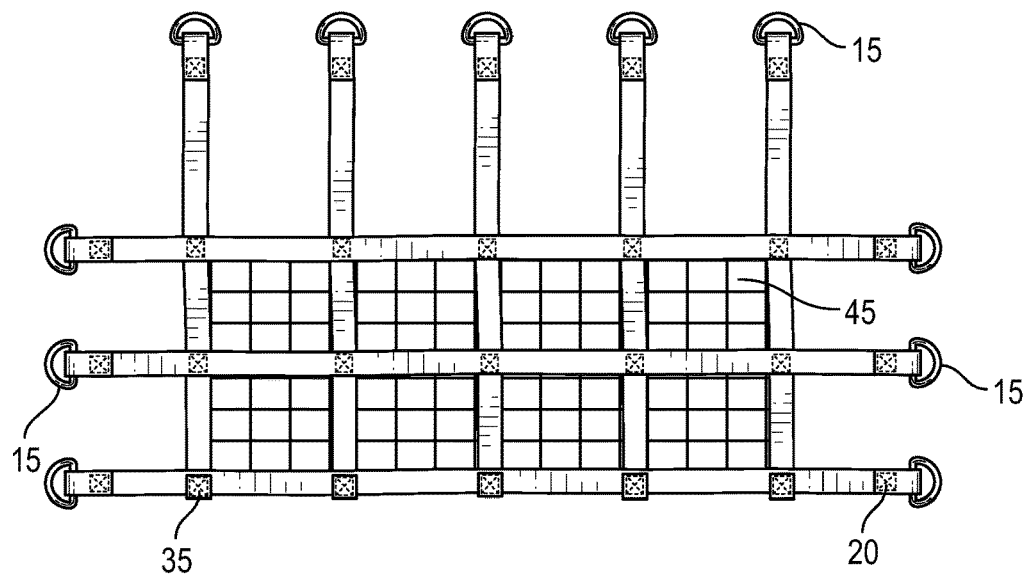
FIG. 8 shows a top view of the truck safety device according to another embodiment of the present invention.

Referring now to FIG. 8 there is shown an optional section of the present invention that covers the truck rack cab side having smaller netting material 45 sewn to the safety device.

Figure 9:
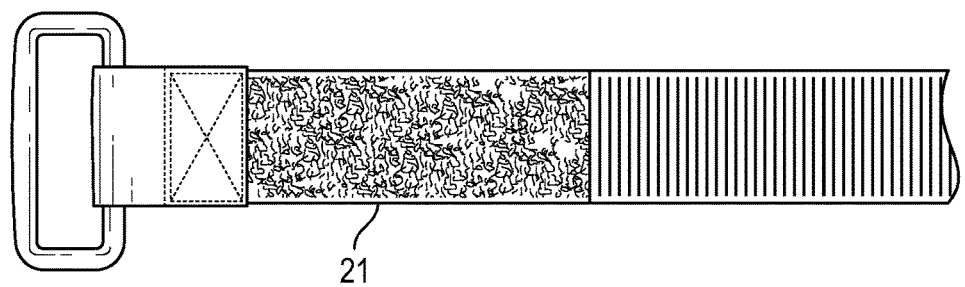
FIG. 9 shows an exploded view of a strap for the truck safety device according to another embodiment of the present invention.
Figure 10:
FIG. 10 shows an exploded view of another strap for the truck safety device according to another embodiment of the present invention.

In FIG. 9 there is shown a blow up view of strap 20 which can be a hook and loop strap 21 or, as shown in in FIG. 10, a cam strap 22.

Figure 11:
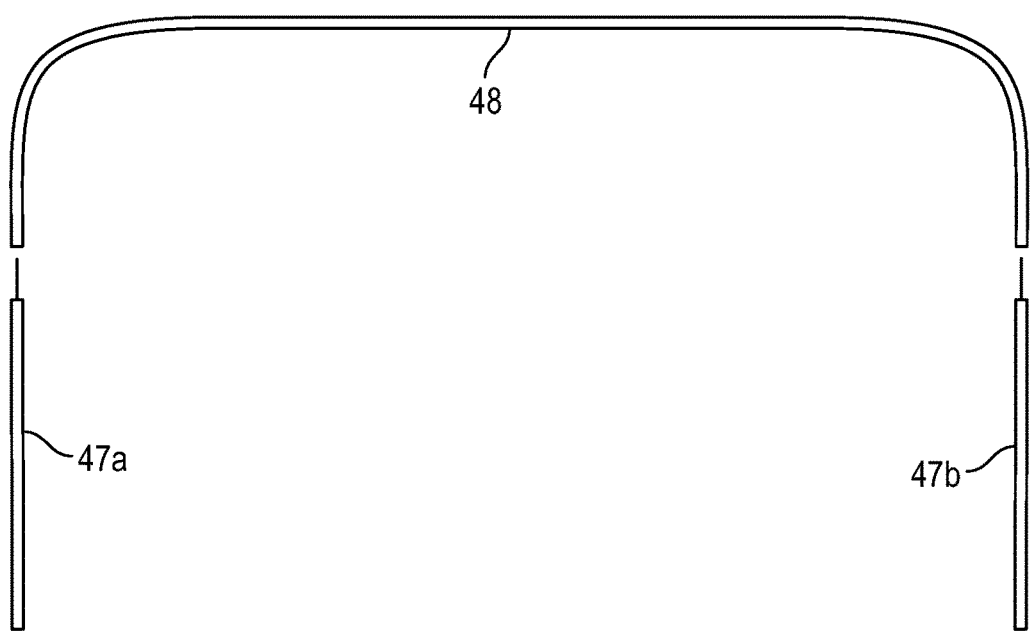
FIG. 11 shows typical rack system of a truck.

Referring now to FIG. 11 there is shown a typical 3 piece support bar 46 that sill slide through the loops in the net or rope then into XX is the top pipe 48 that slides into the side pipes 47a and 47b.

Figure 12:
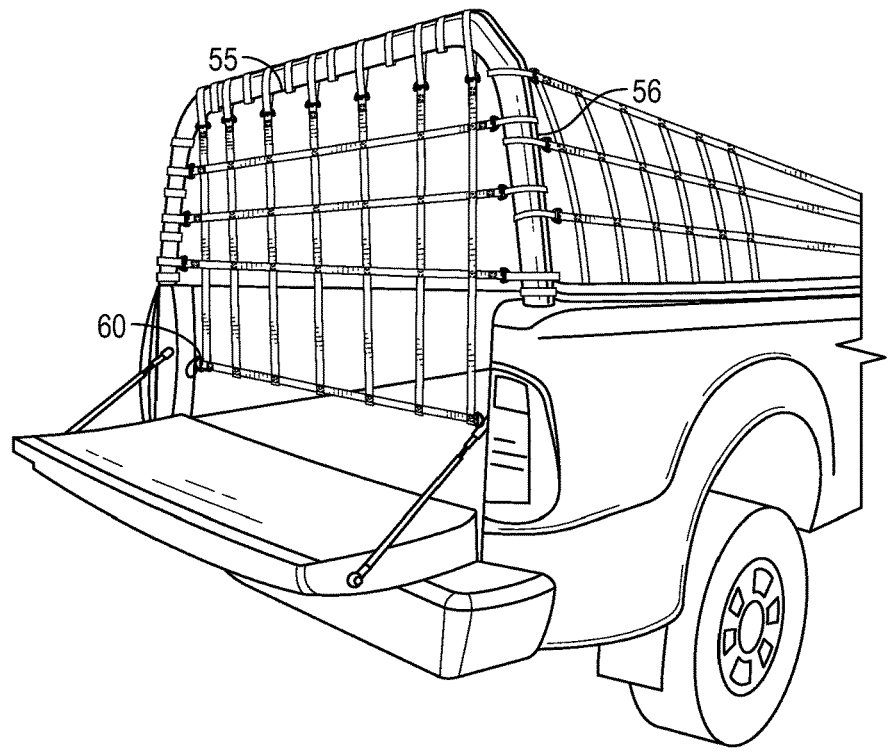
FIG. 12 shows a perspective view of the truck safety device mounted to a truck rack system according to another embodiment of the present invention.

Referring now to FIG. 12 there is shown the safety device 10 as applied to a rear tailgate rack with straps. Points 55 and 56 show how the safety device 10 is attached to the top of the rear tailgate rack with straps. Point 60 shows how the present invention is attached to the bottom of the truck bed also with straps. The safety device in this embodiment can attached with D-rings to the rear rack and made from either nylon or rope to match the main portion of the device.

Figure 13:
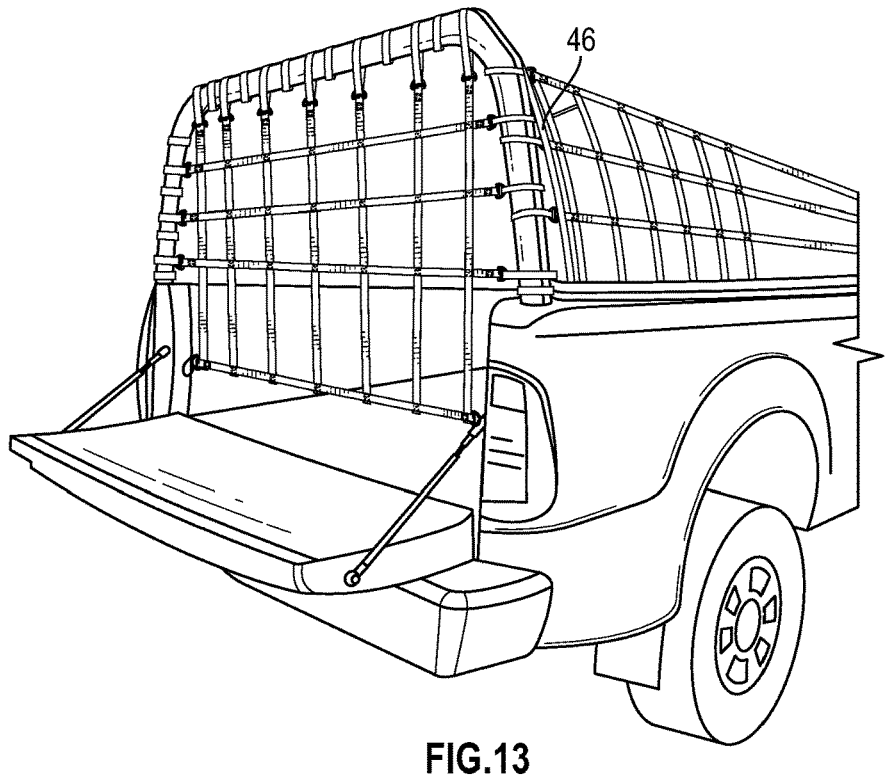
FIG. 13 shows another perspective view of the truck safety device mounted to a truck rack system according to another embodiment of the present invention.

FIG. 13 is similar to the design as shown in FIG. 12 with support bar 46 installed.

Figure 14:
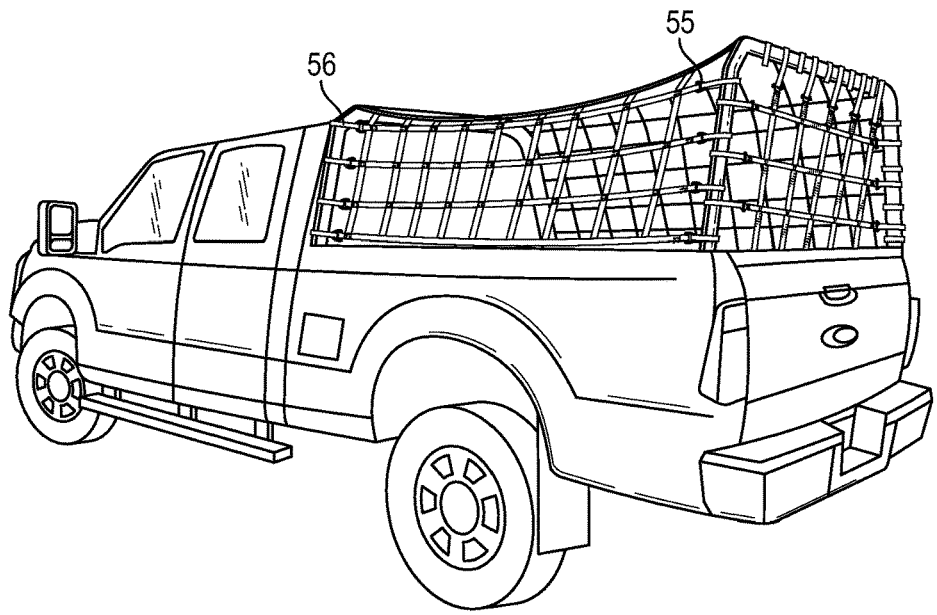
FIG. 14 shows another perspective view of the truck safety device mounted to a truck rack system according to another embodiment of the present invention.
Figure 15:
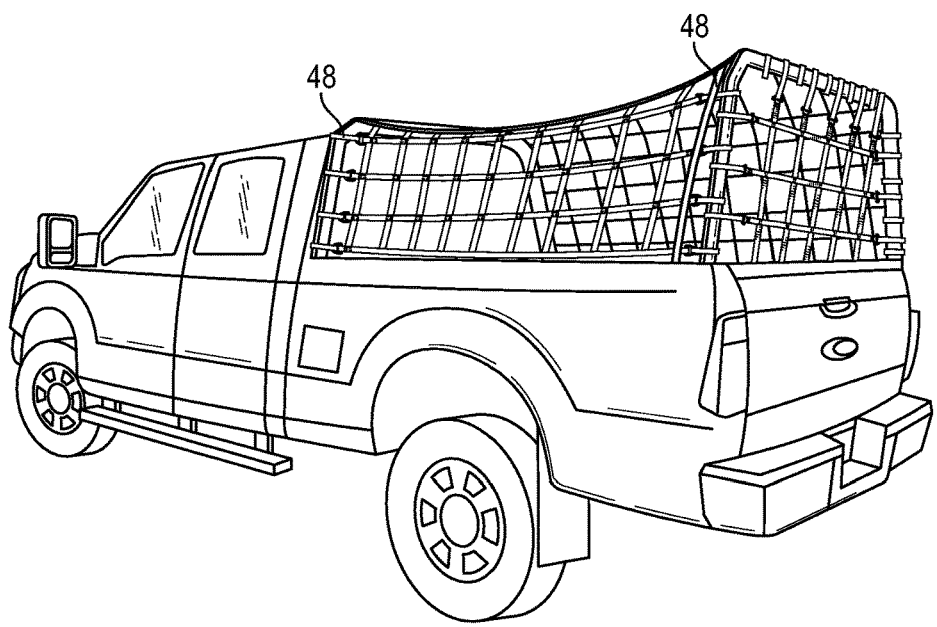
FIG. 15 shows another perspective view of the truck safety device mounted to a truck rack system according to another embodiment of the present invention.

Referring now to FIG. 14 there is shown a side view of the present invention attached to the front and rear racks with D-rings 15 and straps. FIG. 15 is another side view of the safety device showing the inclusion of the 3 piece support pipe 48 and straps according to FIG. 11.

Figure 16:
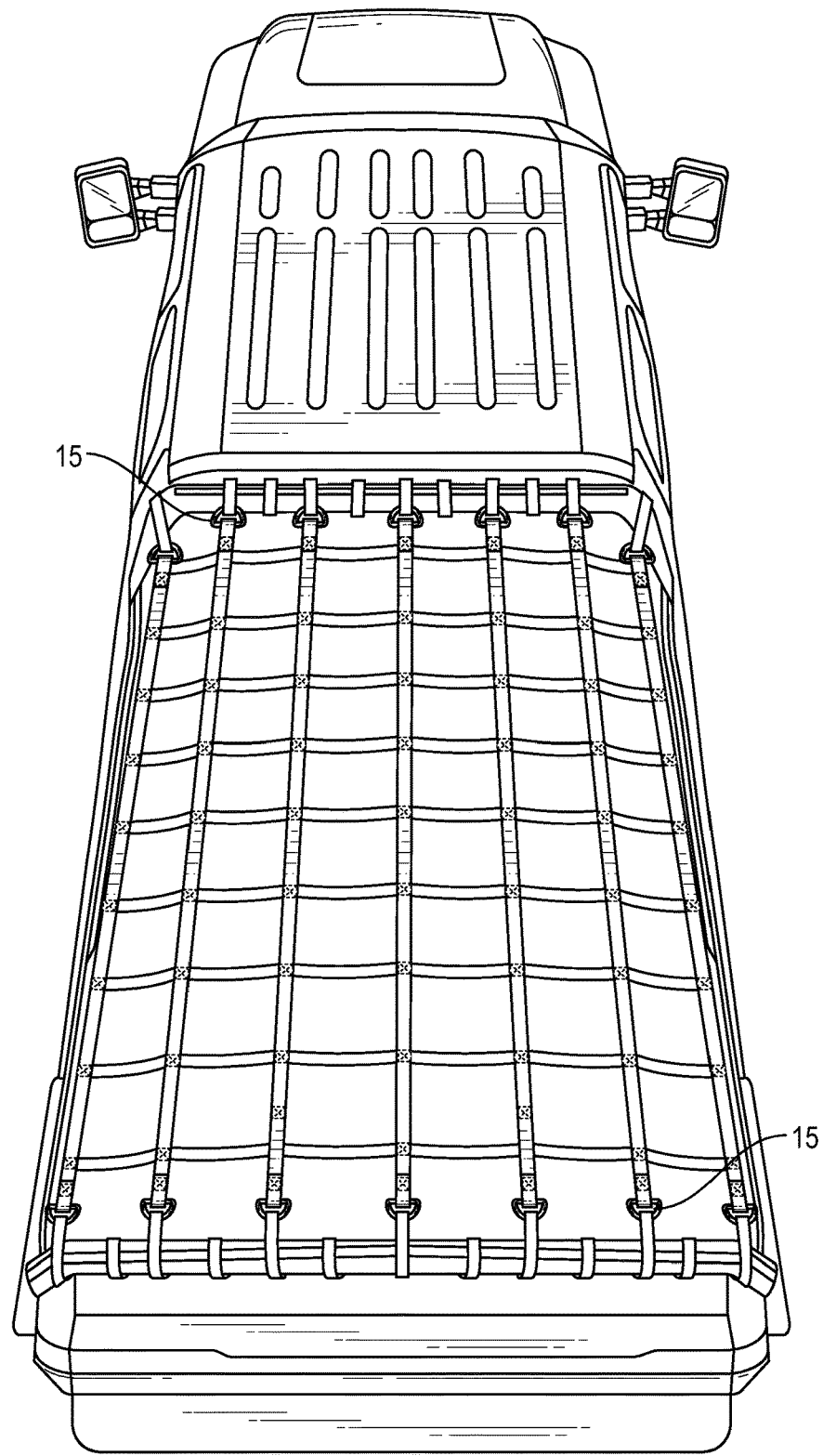
FIG. 16 shows a top view of the truck safety device mounted to a truck rack system according to another embodiment of the present invention.

FIG. 16 shows a top view of the present invention attached to the truck racks with b-rings 15 and straps. The D-rings of the safety device 10 are attached the rear (tailgate) rack with straps. The D-rings attached to the present invention to the front (cab) rack with straps.

Figure 17:
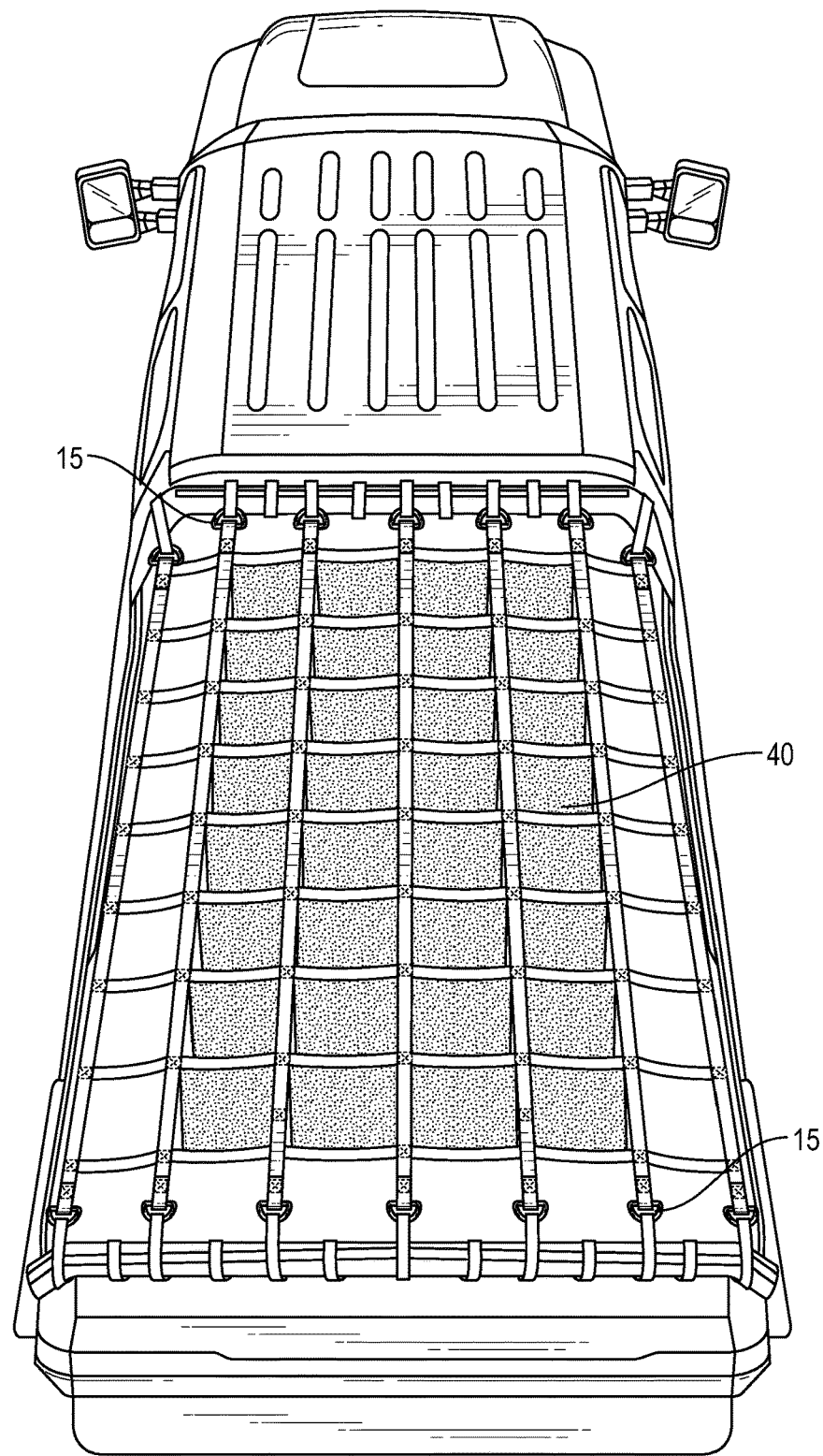
FIG. 17 shows another top view of the truck safety device mounted to a truck rack system according to another embodiment of the present invention.
Figure 18:
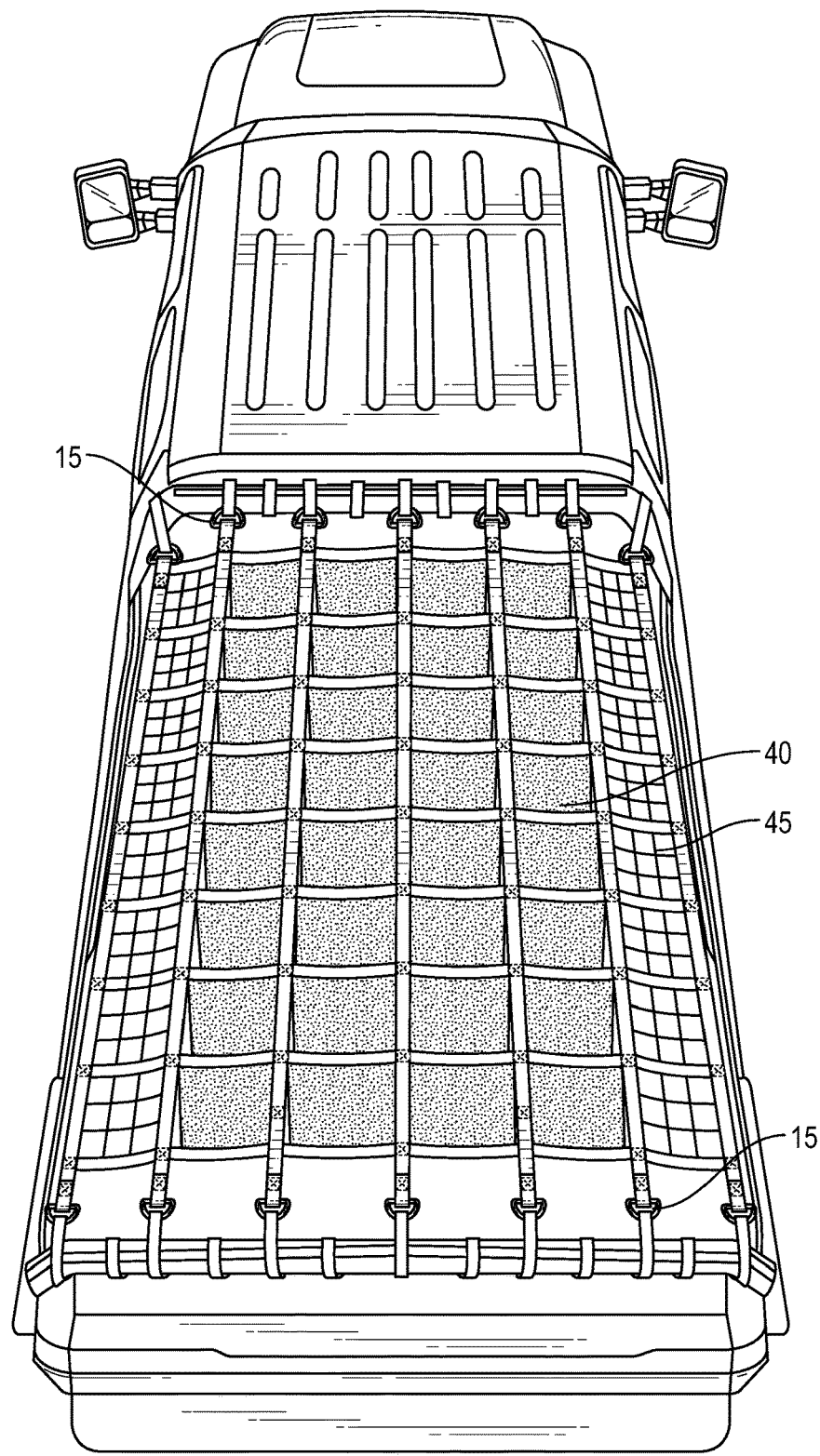
FIG. 18 shows another top view of the truck safety device mounted to a truck rack system according to another embodiment of the present invention.

In FIG. 17 there is shown a top view of the safety device attached to the truck racks with D-rings and straps, where the safety device includes shaded section 40 which is a weatherproof center cover sewn to the net. This allows for some protection for the dog from sun and rain. FIG. 18 shows the weatherproof center cover sewn to the safety device along with smaller sized netting 45 sewn to or (Velcro) hook and looped strapping to the sides of the net allowing for more protection and in some cases keeping the dogs head in.

Figure 19:
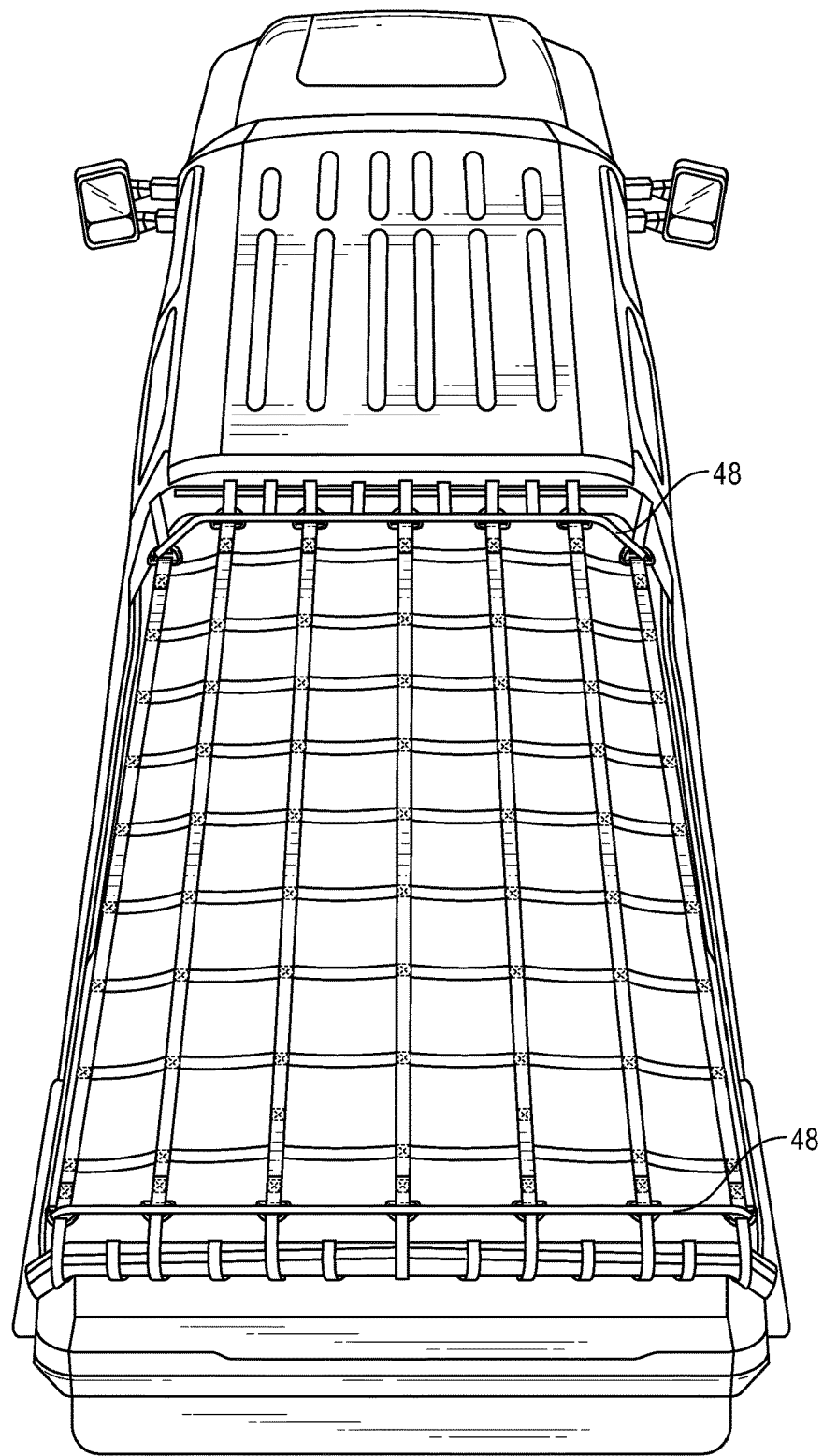
FIG. 19 shows another top view of the truck safety device mounted to a truck rack system according to another embodiment of the present invention.

FIG. 19 shows the safety device having the 3 piece support bar 48 attached to the rear (tailgate) rack with straps and attached to the front (cab) rack with straps.

Figure 20:
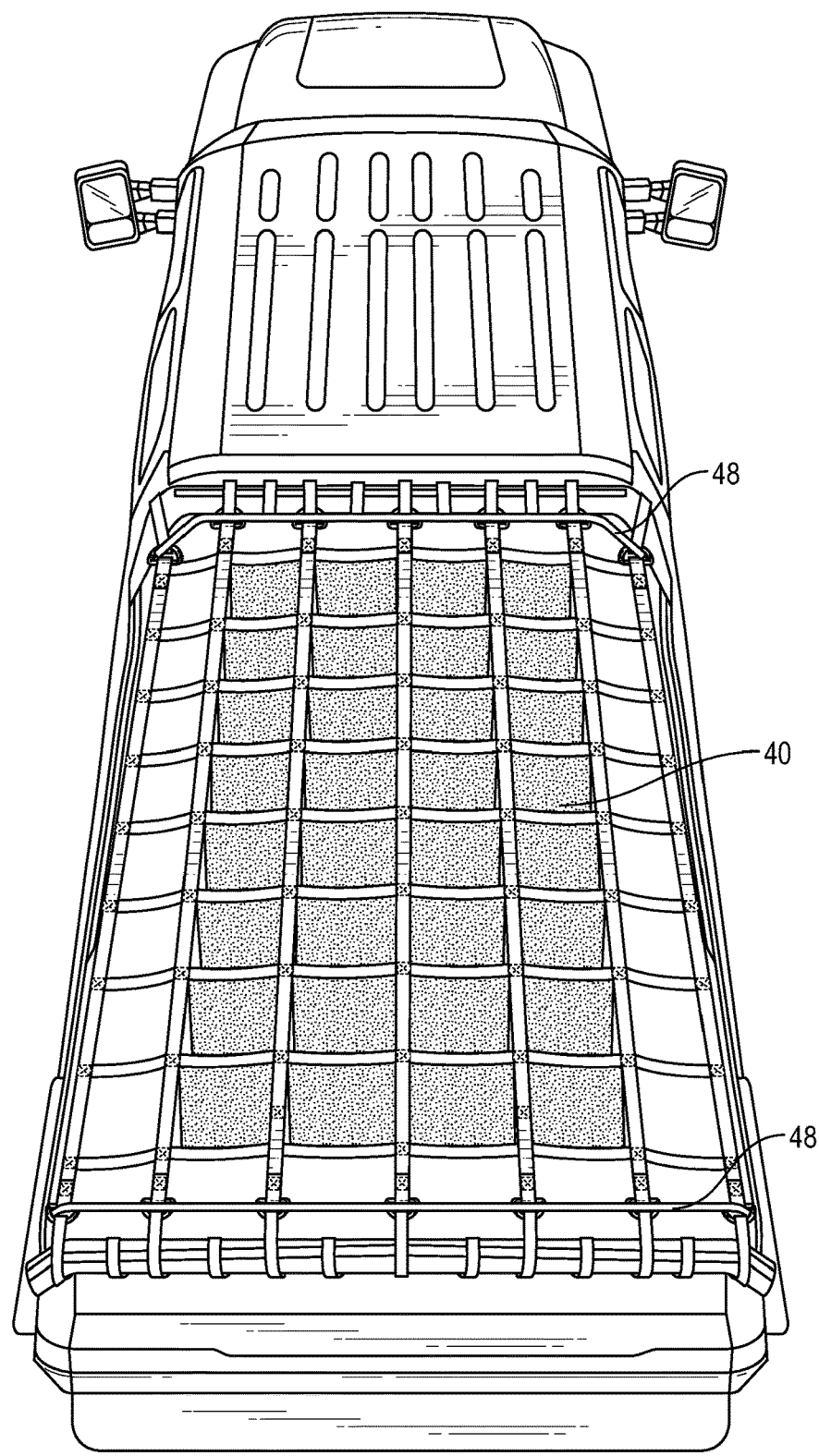
FIG. 20 shows another top view of the truck safety device mounted to a truck rack system according to another embodiment of the present invention.

FIG. 20 shows the safety device 10 with the 3 piece support bar 48 attached to the present invention to the rear (tailgate) rack with straps and to the front (cab) rack with straps along with the weatherproof center cover 40 sewn to the net.

Figure 21:
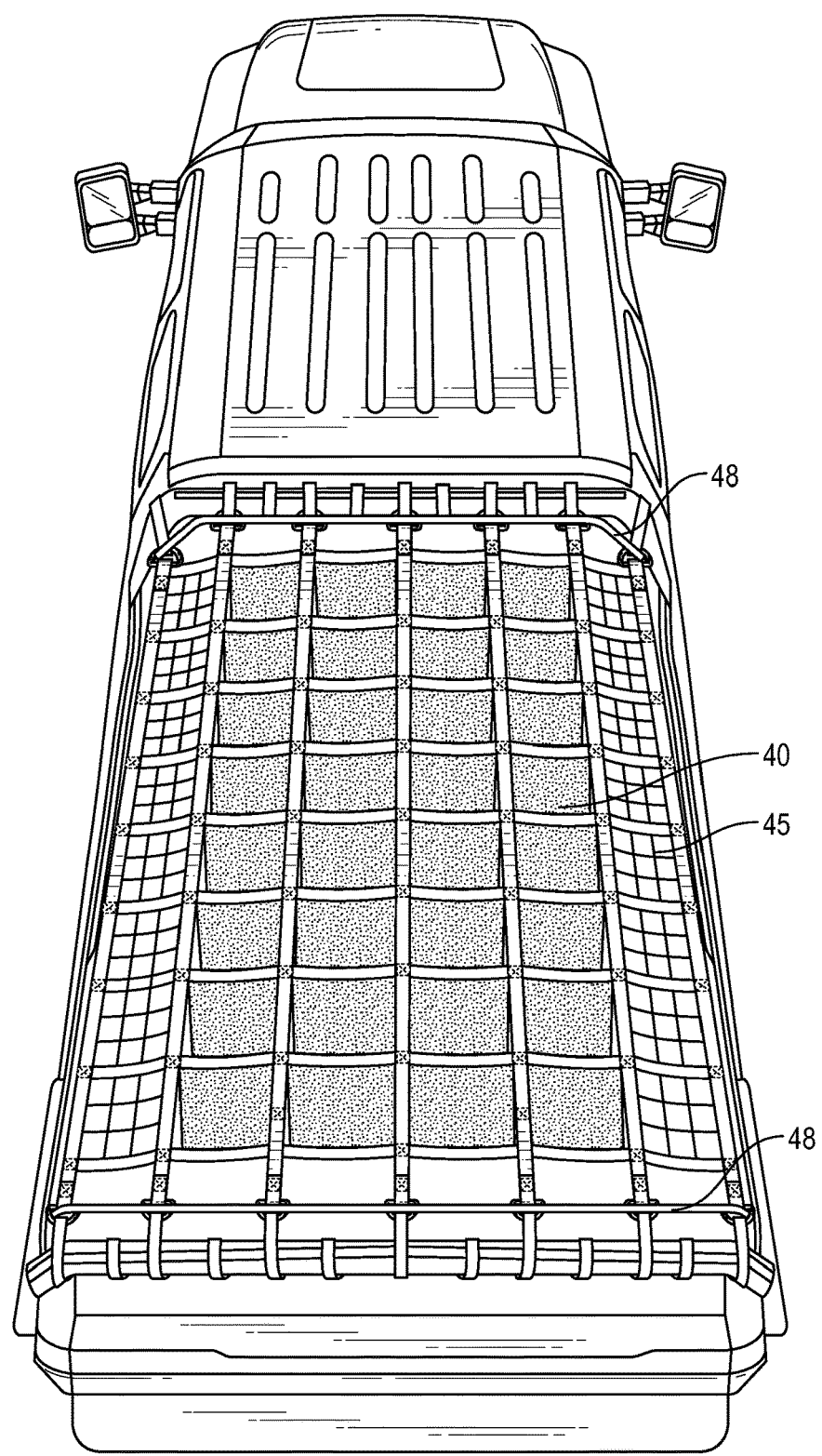
FIG. 21 shows another top view of the truck safety device mounted to a truck rack system according to another embodiment of the present invention.

FIG. 21 shows the safety device 10 having the 3 piece support bar 48 and straps, the weatherproof center cover 40 sewn to the net and smaller sized netting 45 sewn to or (Velcro) hook and looped strapping to the sides of the safety device 10.

Figure 22:
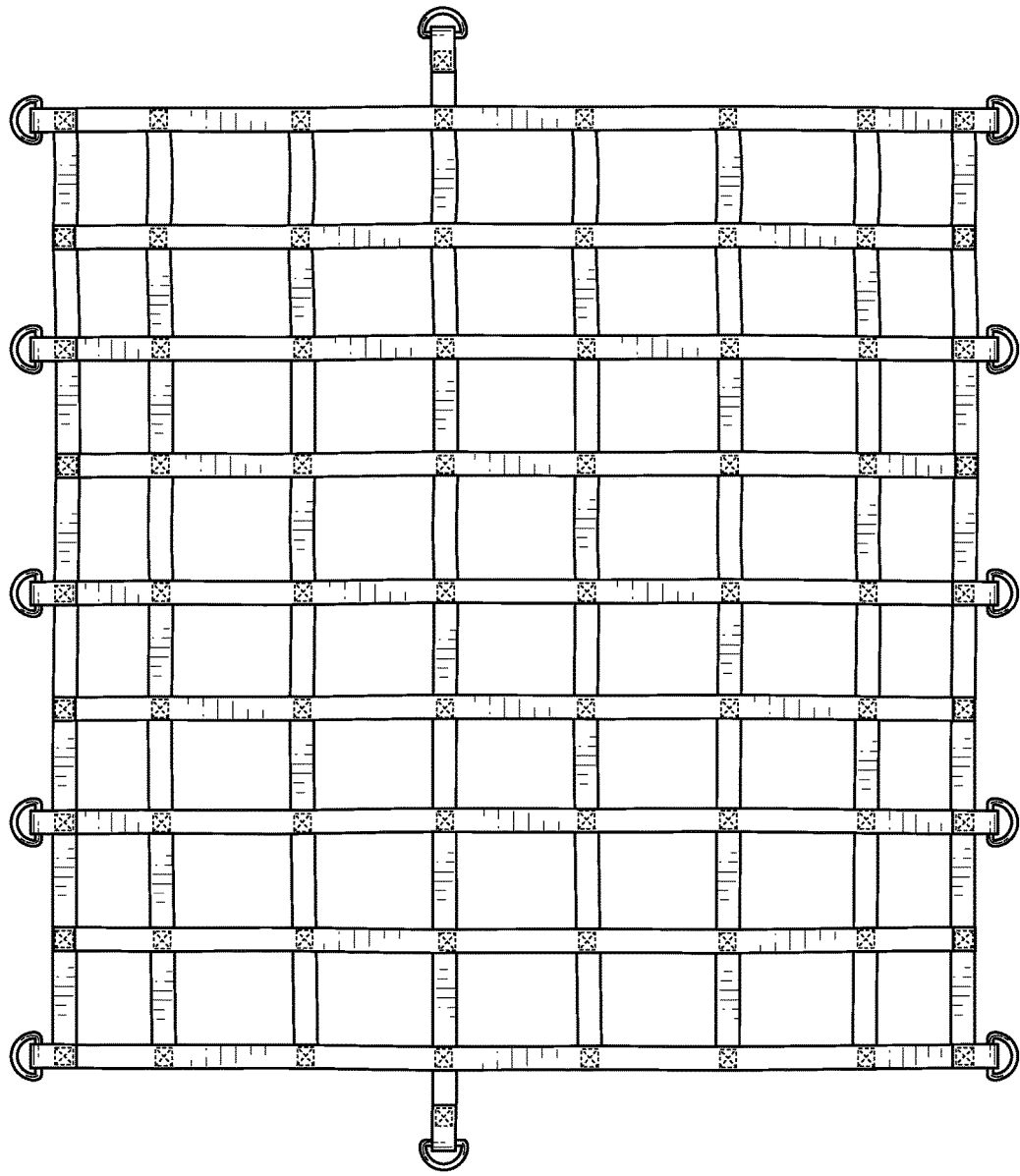
FIGS. 22-33 show various configurations of the truck safety device as described in the above figures.

FIG. 22 shows safety device 10 with D-Rings and side strap to secure to side of truck bed.

Figure 23:
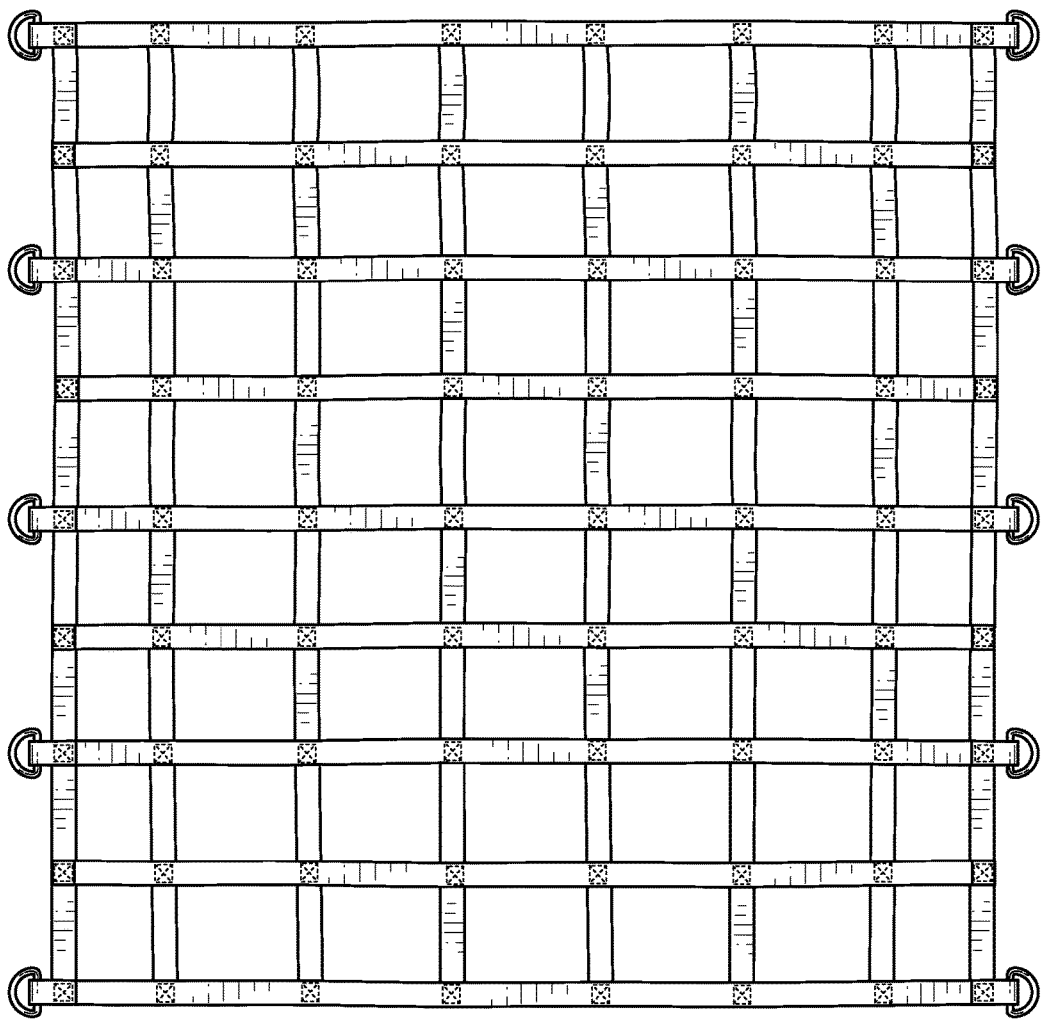

FIG. 23 shows safety device 10 with D-Rings.

Figure 24:
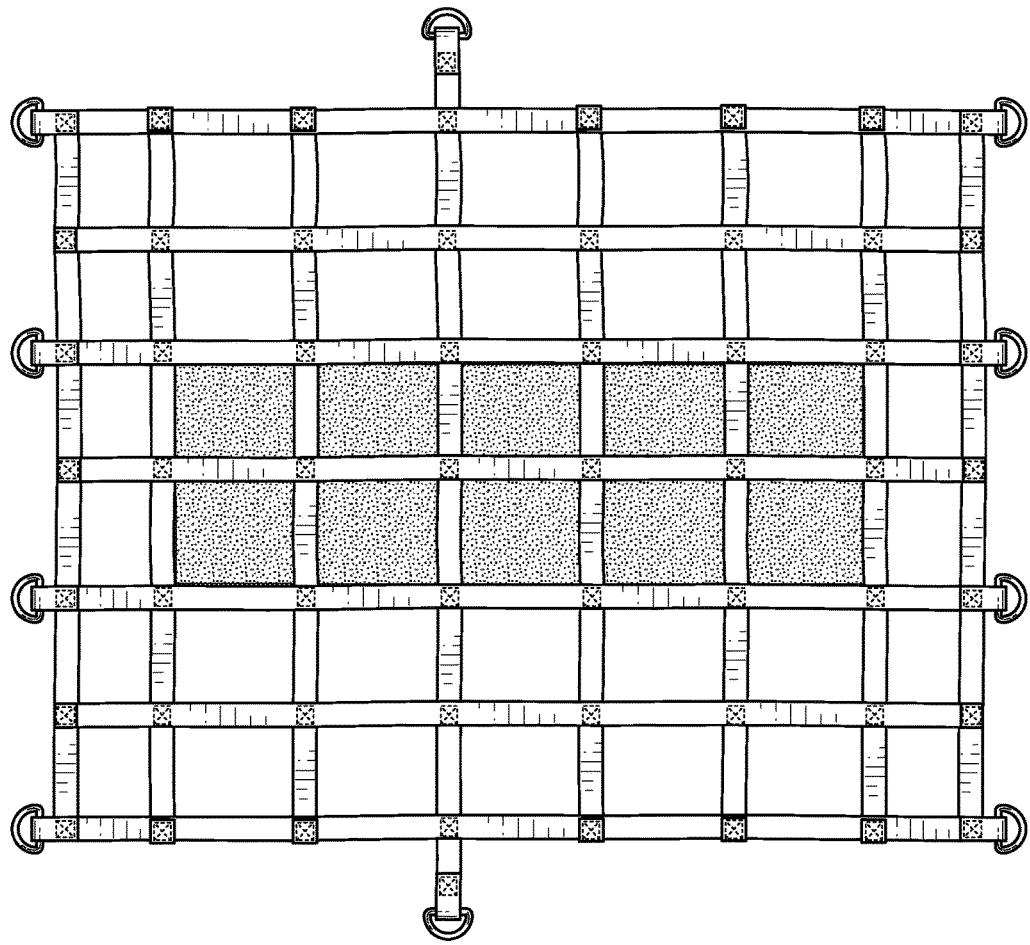

FIG. 24 shows safety device 10 with a cover, D-Rings, and side strap to secure to side of truck bed.

Figure 25:
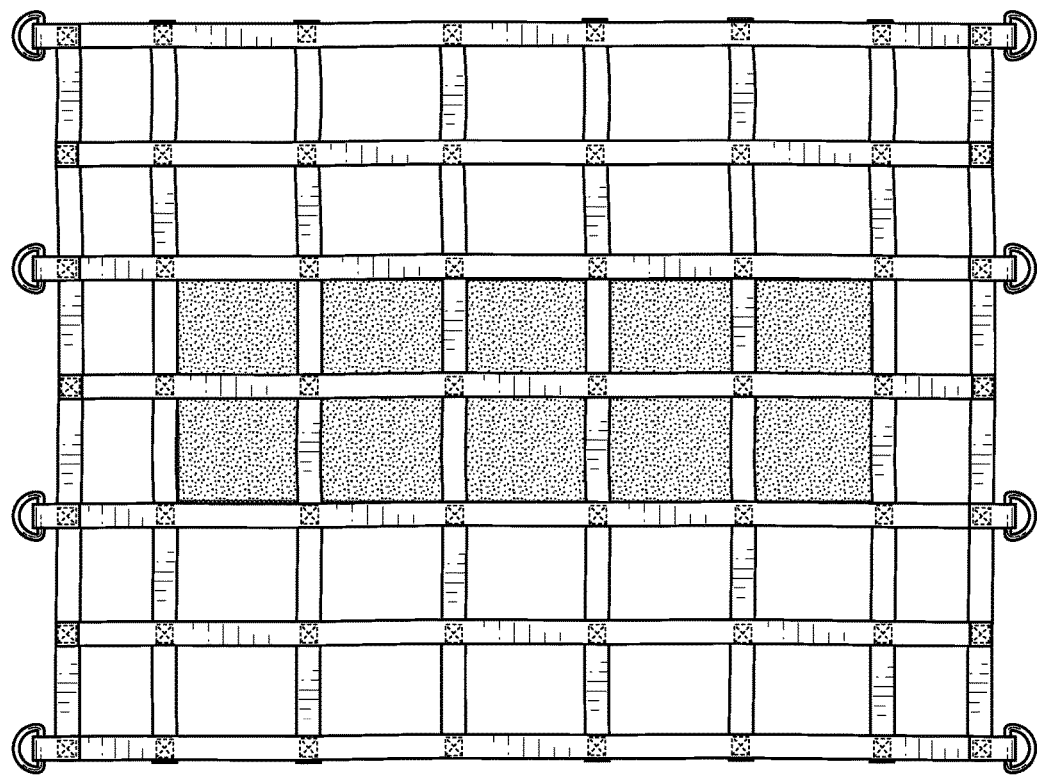

FIG. 25 shows safety device 10 with a cover and D-Rings.

Figure 26:
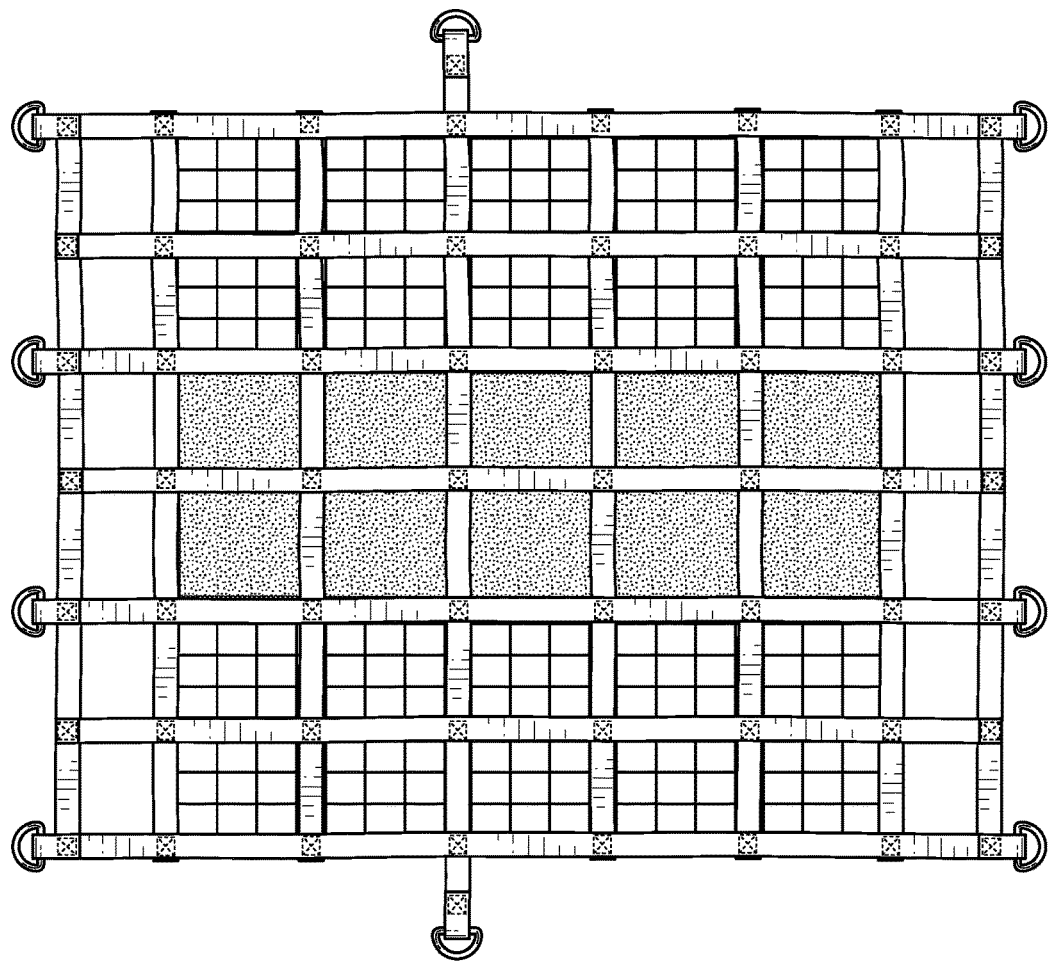

FIG. 26 shows safety device 10 with a cover, a screen, D-Rings, and side strap to secure to side of truck bed.

Figure 27:
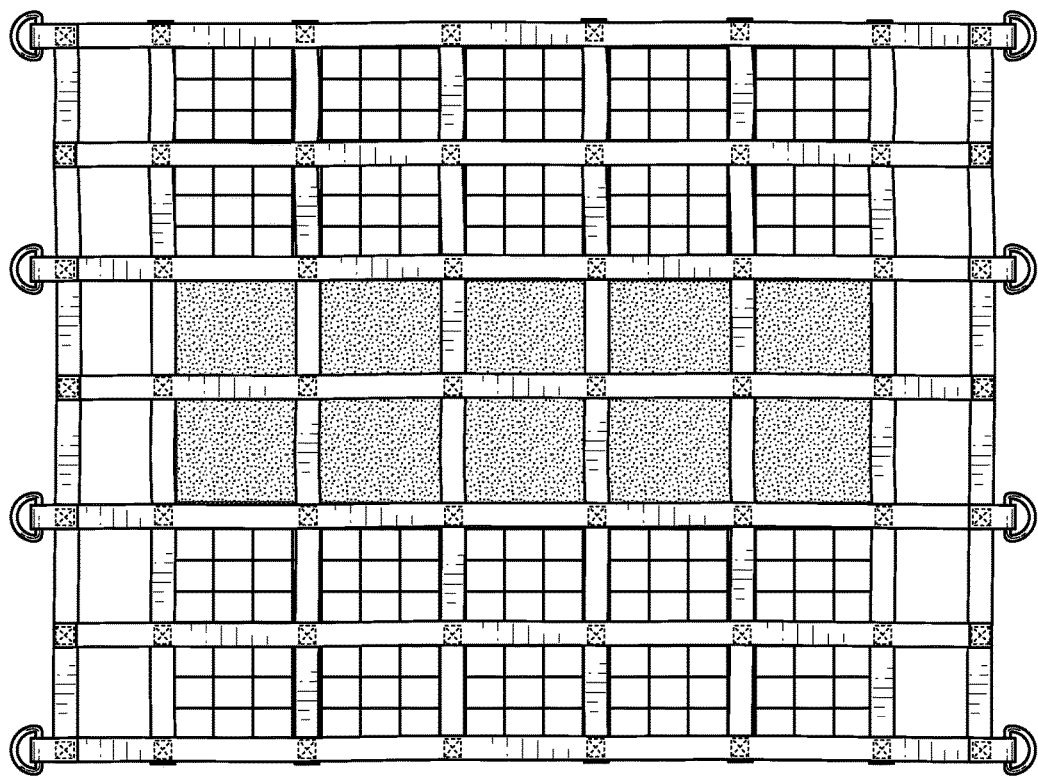

FIG. 27 shows safety device 10 with D-Rings, a cover, and a screen.

Figure 28:
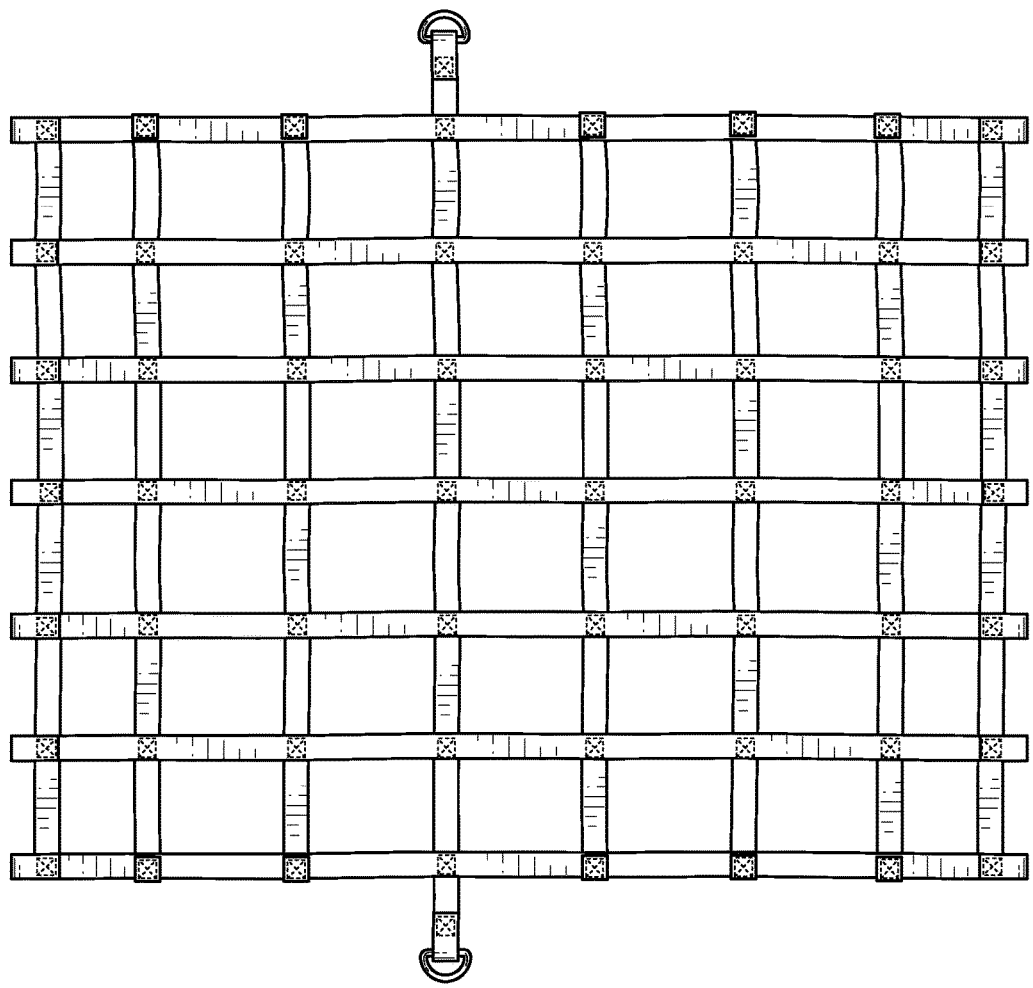

FIG. 28 shows safety device 10 configured for a support bar with side strap to secure to side of truck bed.

Figure 29:
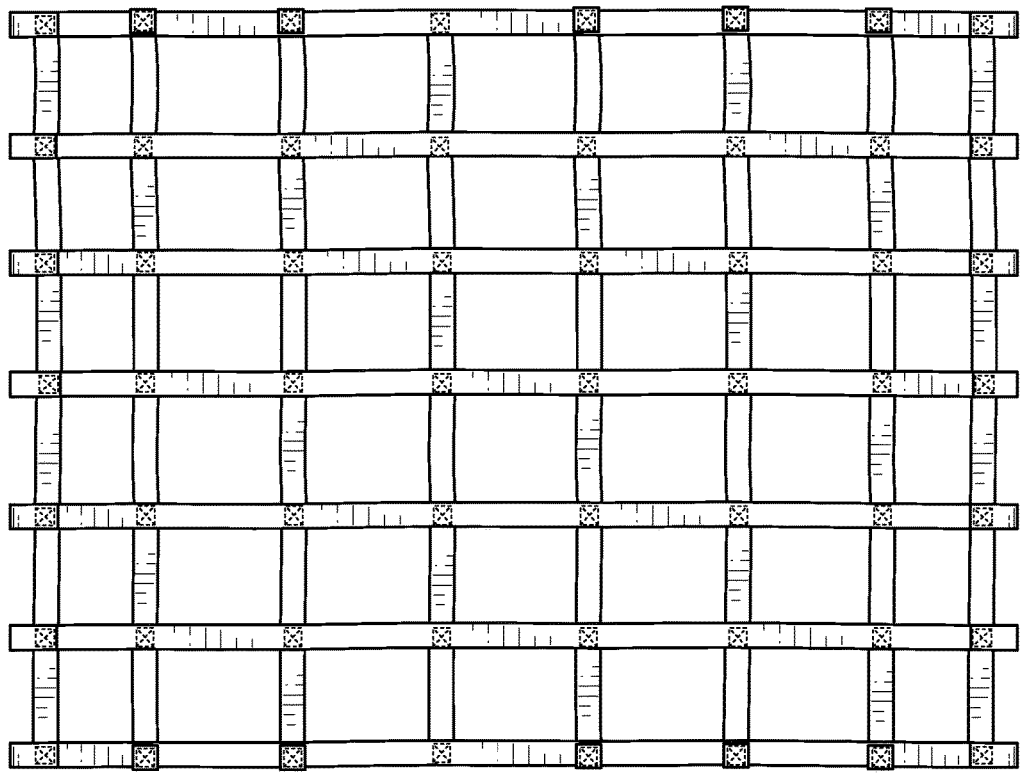

FIG. 29 shows safety device 10 configured for a support bar.

Figure 30:
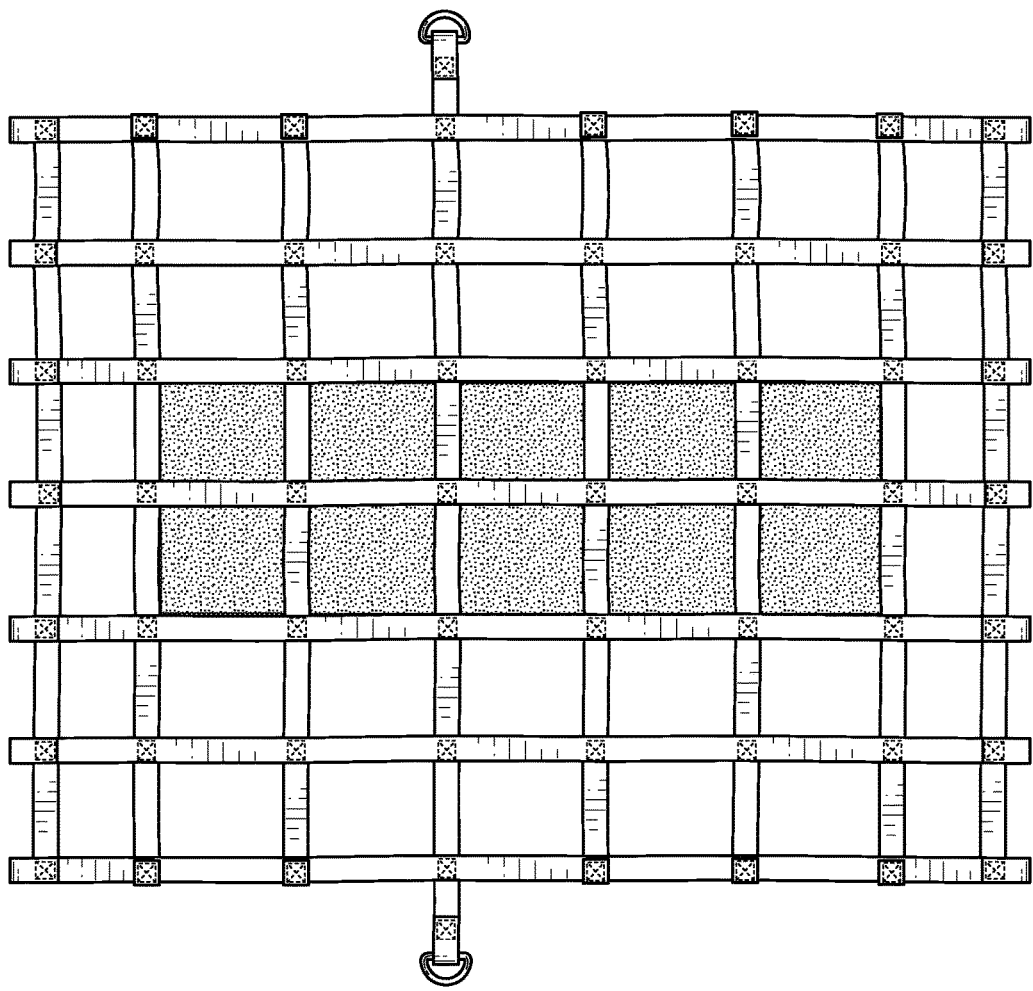

FIG. 30 shows safety device 10 configured for a support bar with a cover, and side straps to secure to side of truck bed.

Figure 31:
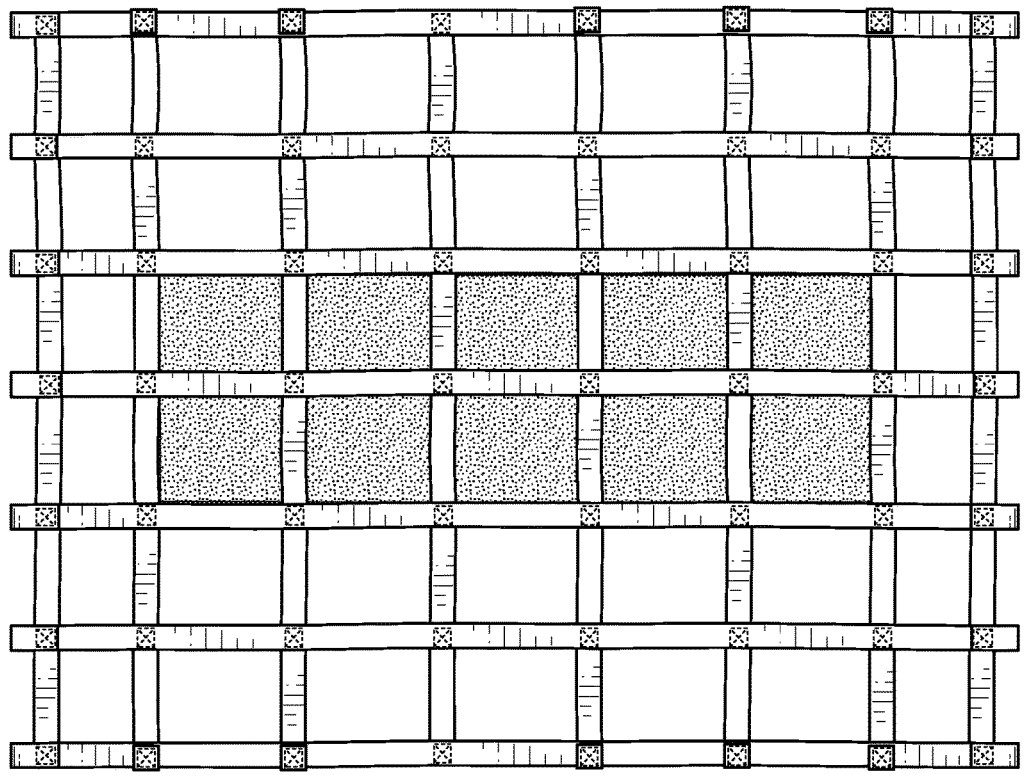

FIG. 31 shows safety device 10 configured for a support bar with a cover.

Figure 32:
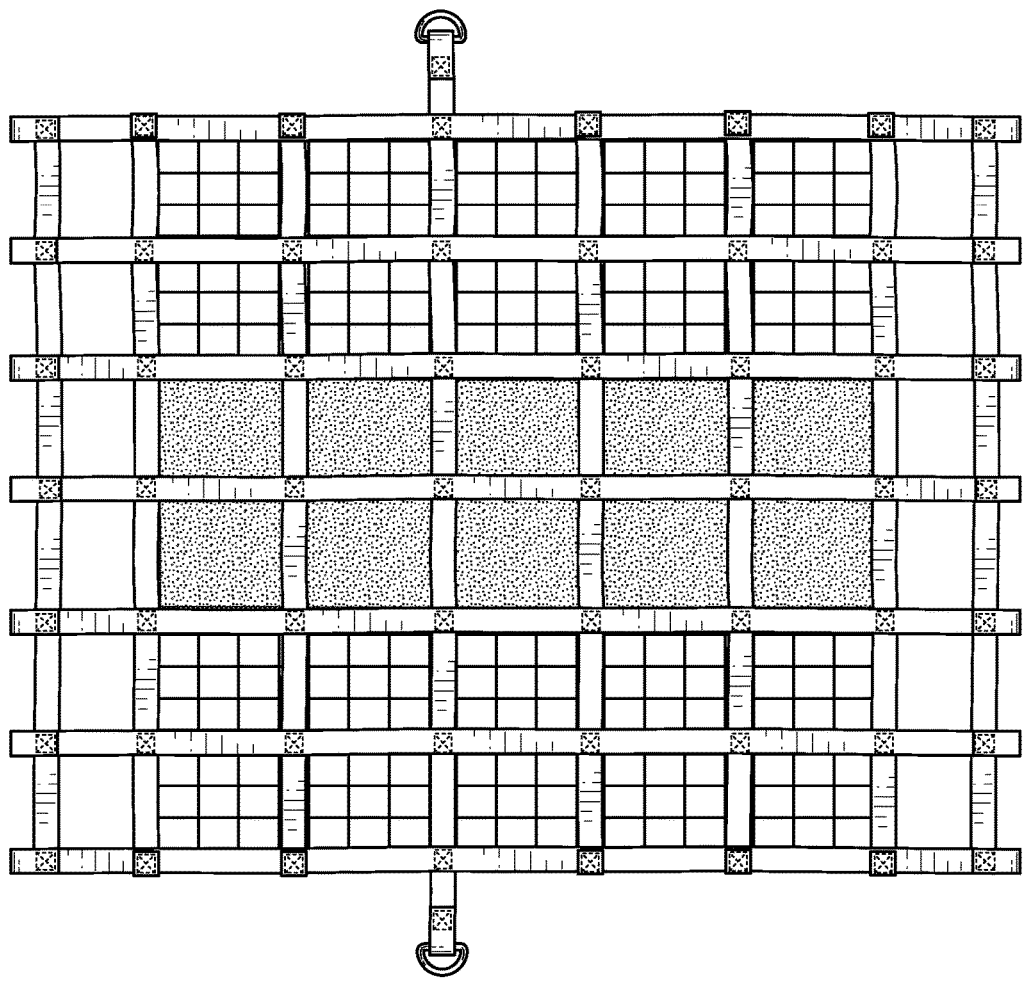

FIG. 32 shows safety device 10 configured for a support bar with a cover, a screen, and side straps to secure to side of truck bed.

Figure 33:
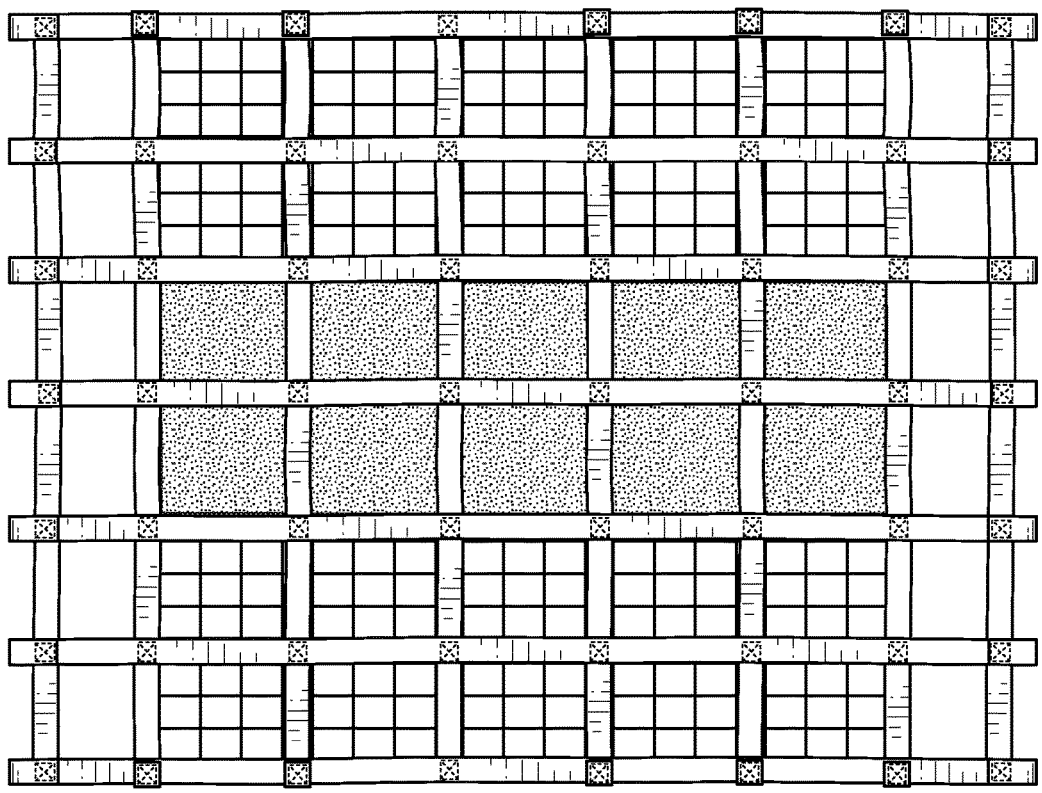
Figure 34:
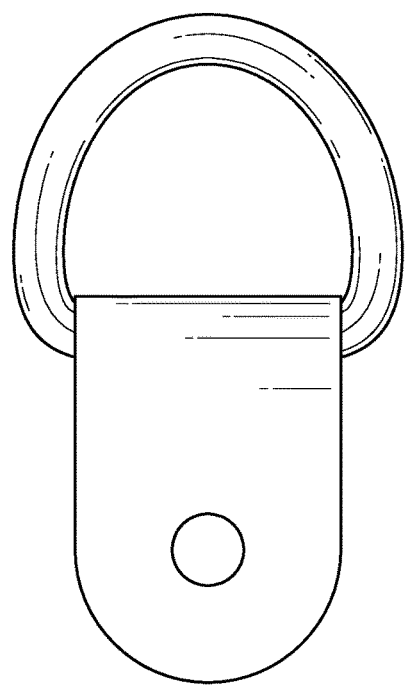
FIGS. 34-37 show various straps used with the truck safety device according to the present invention.
Figure 35:
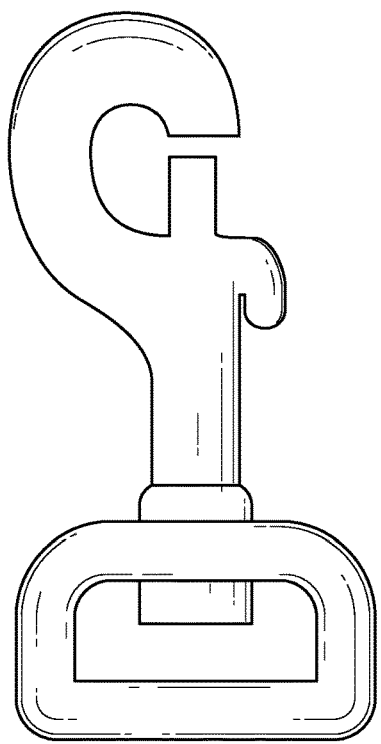
Figure 36:
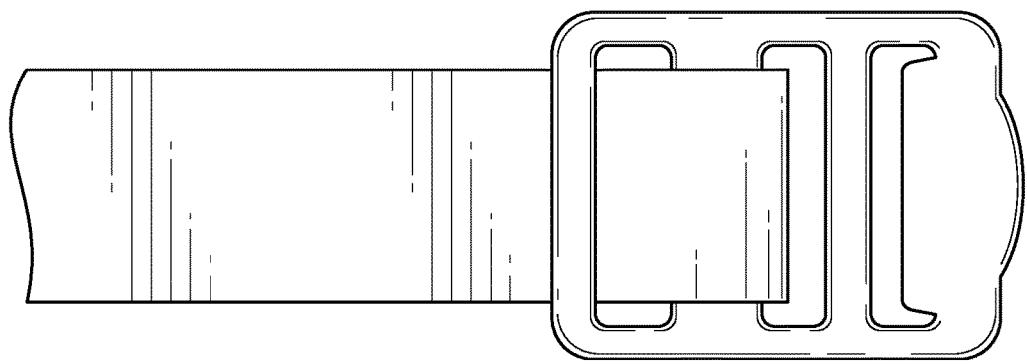
Figure 37:
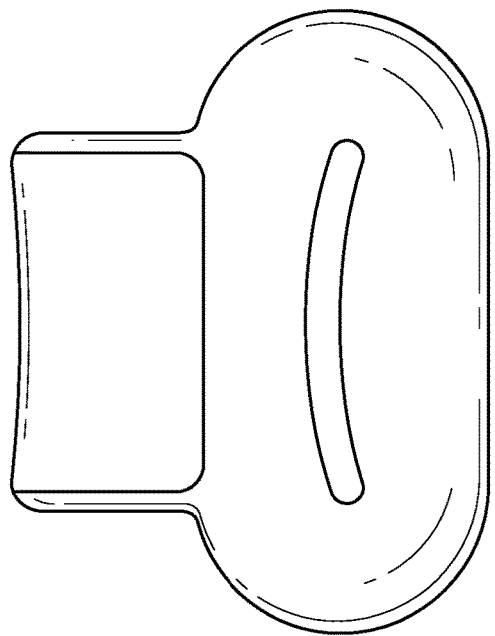

FIG. 33 shows safety device 10 configured for a support bar with a cover, and a screen.

FIGS. 34-37 show various clips and means to connect or affix truck safety device 10 to truck bed.

It will be apparent to one of skill in the art that described herein is a novel truck bed safety device. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A safety device for securing the space of a truck bed, the safety device comprising:
   at least one elongated barrier net which is capable of extending from a proximity of a front end of a truck bed to a rear end of said truck bed, the net structured and arranged to form the space of the truck bed having a dimension outlined by the truck bed and a rack system rigidly affixed the truck bed, the barrier net projecting across the dimension of said truck bed in an amount sufficient to constitute an effective security barrier for items located within said space of the truck bed and to provide a barrier to retain said items within said truck bed, wherein said barrier net is releasably fixed to said truck bed such that the barrier net is held flexibly and securely in place substantially parallel to an exterior plane of the dimension outlined by said truck bed and the rack system, a heavy debris liner comprised of a coarse mesh for preventing the passage of heavy articles of debris through said net barrier; and a fine debris liner comprised of a fine mesh for preventing the passage of smaller articles of debris through said net barrier.

2. The safety device according to claim 1 further comprising a series of releasable ropes forming substantially square spaces sized and shaped to restrict items from passing through said net barrier.

3. The safety device according to claim 1 further comprising a series of releasable connections such that said net may be releasably connected to a rack system connected to the truck.

4. The safety device according to claim 1 further comprising a solid material affixed to the barrier net in order to provide shade and shelter to the interior of the truck bed.

5. The safety device according to claim 2 where said ropes are substantially flat.

6. The safety device according to claim 1 wherein said net is made from a material that is flexible and provides a predetermined tensile strength such that a live animal may be safely transported within said truck bed.

7. The safety device according to claim 1 further comprising a series of ropes interwoven at substantially right angles in order to form the cage shaped substantially similar to a dimension outlined by said truck bed where said truck bed.

8. The safety device according to claim 1, where said fine mesh portion of said barrier net being releasably attached on at least one side or edge of said barrier net so that said side or edge of said barrier net detaches at a predetermined wind or weight loading.

* * * * *

UNITED STATES PATENT AND TRADEMARK OFFICE
CERTIFICATE OF CORRECTION

| | |
|---|---|
| PATENT NO. | : 10,470,434 B2 |
| APPLICATION NO. | : 16/239699 |
| DATED | : November 12, 2019 |
| INVENTOR(S) | : Thomas J. Fahey |

It is certified that error appears in the above-identified patent and that said Letters Patent is hereby corrected as shown below:

In the Specification

Column 5, Line 66, please change "b-rings" to --D-rings--

Signed and Sealed this
Twenty-fifth Day of February, 2020

Andrei Iancu
*Director of the United States Patent and Trademark Office*